(12) United States Patent
Aoki

(10) Patent No.: US 6,681,586 B2
(45) Date of Patent: Jan. 27, 2004

(54) VEHICLE AIR CONDITIONER WITH ADJUSTING FUNCTION BASED ON SUNLIGHT AMOUNT

(75) Inventor: Shinji Aoki, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/266,663

(22) Filed: Oct. 8, 2002

(65) Prior Publication Data

US 2003/0066299 A1 Apr. 10, 2003

(30) Foreign Application Priority Data

Oct. 9, 2001 (JP) ........................................ 2001-311677

(51) Int. Cl.[7] ............................ F25D 17/04; F05D 23/00
(52) U.S. Cl. ........................................ 62/186; 236/91 C
(58) Field of Search ........................... 62/186, 244, 179; 236/91 C, 91 E, 49.3; 165/203; 454/25

(56) References Cited

U.S. PATENT DOCUMENTS

| | | | | |
|---|---|---|---|---|
| 4,434,932 A | * | 3/1984 | Hara et al. .................... 236/49 |
| 4,961,462 A | * | 10/1990 | Iida et al. ...................... 165/12 |
| 5,020,424 A | * | 6/1991 | Iida et al. ..................... 98/2.01 |
| 5,031,830 A | * | 7/1991 | Ogino et al. ............... 236/91 C |
| 5,056,421 A | * | 10/1991 | Iida ............................. 98/2.01 |
| 5,072,106 A | * | 12/1991 | Osawa ..................... 250/206.1 |
| 5,181,654 A | * | 1/1993 | Yoshimi et al. ........... 236/91 C |
| 5,186,682 A | * | 2/1993 | Iida .............................. 454/75 |
| 5,337,802 A | * | 8/1994 | Kajino et al. ................. 165/22 |
| 5,340,021 A | * | 8/1994 | Kajino et al. .............. 236/49.3 |
| 5,553,661 A | * | 9/1996 | Beyerlein et al. ........... 165/203 |
| 5,704,544 A | * | 1/1998 | Samukawa et al. ........ 236/49.3 |
| 5,860,593 A | * | 1/1999 | Heinle et al. ............. 236/91 C |
| 6,185,950 B1 | * | 2/2001 | Baruschke et al. ........... 62/244 |
| 6,454,178 B1 | * | 9/2002 | Fusco et al. ............... 236/49.3 |
| 2002/0125332 A1 | * | 9/2002 | Aoki et al. ................ 236/49.3 |
| 2002/0139862 A1 | * | 10/2002 | Tsunoda et al. .......... 236/91 C |

FOREIGN PATENT DOCUMENTS

| | | |
|---|---|---|
| JP | 9-132020 | 5/1997 |
| JP | 10-76831 | 3/1998 |

* cited by examiner

Primary Examiner—Marc Norman
(74) Attorney, Agent, or Firm—Harness, Dickey & Pierce, PLC

(57) ABSTRACT

An air conditioner for a vehicle has a sunlight amount sensor for detecting the amount of sunlight incident into a vehicle, the other sensors and an air conditioning control device that controls the blowing out amount of the conditioned air at each blow-out port in association with the signals detected by the sensors. The air conditioning control device conditions the air by using the fixed amount of sunlight when the change in the amount of sunlight detected by the sunlight amount sensor is equal to or less than a predetermined value so that the air conditioning is performed comfortably for a passenger.

12 Claims, 17 Drawing Sheets

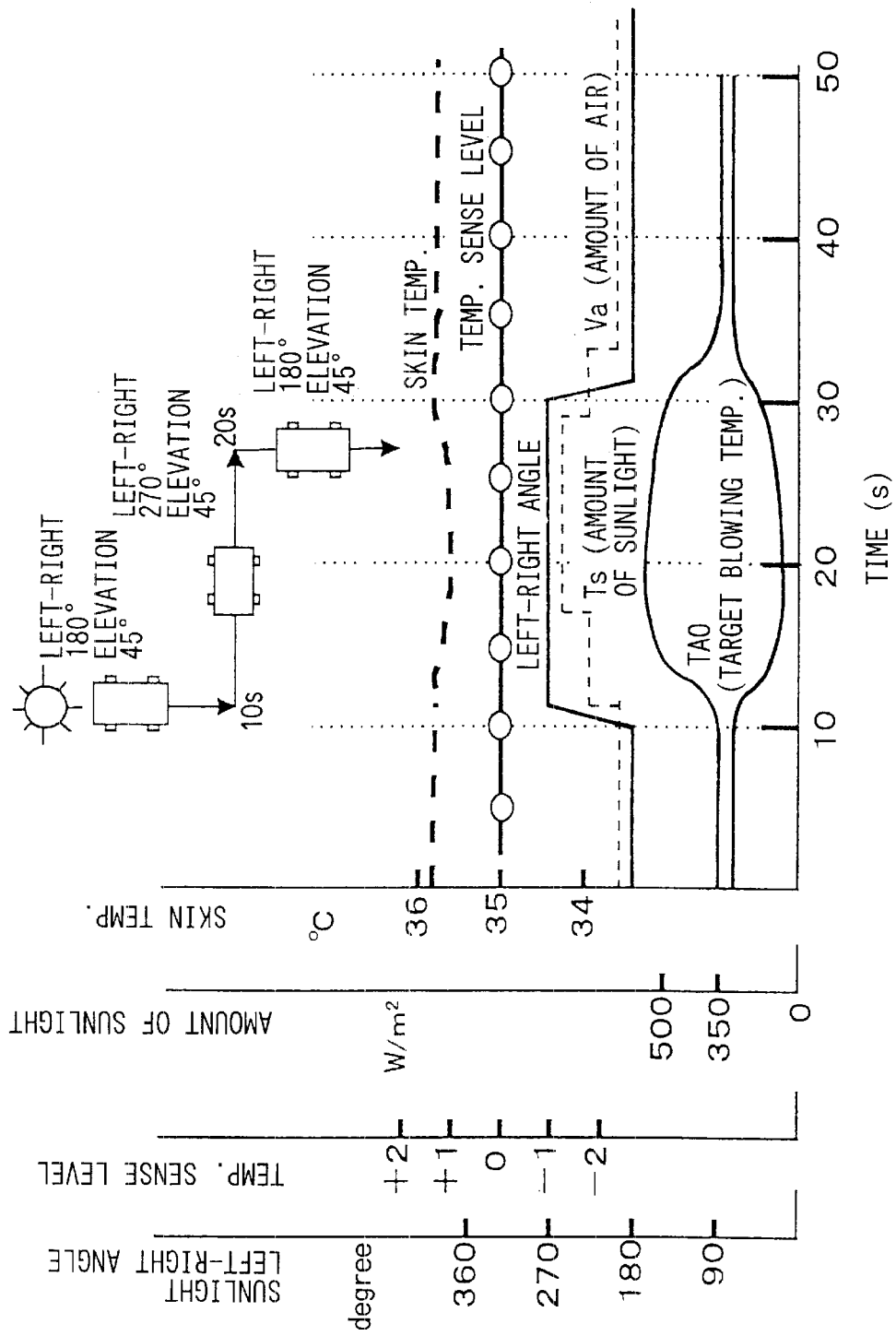

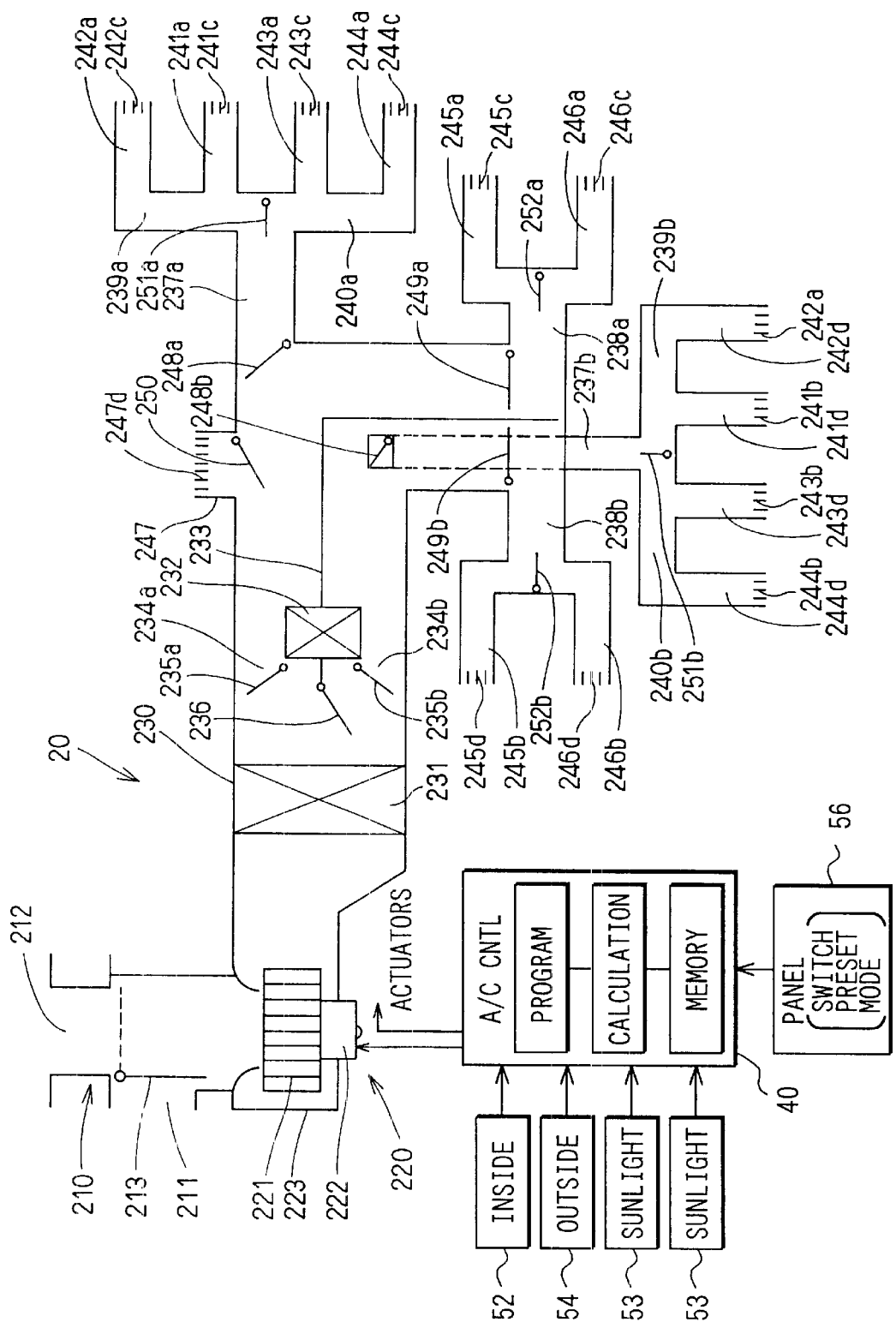

RELATION BETWEEN DATE·TIME AND SUNLIGHT (Tokyo Area)

CORRECTION COEFFICIENT

VEHICLE AIR CONDITIONER WITH ADJUSTING FUNCTION BASED ON SUNLIGHT AMOUNT

CROSS REFERENCE TO RELATED APPLICATION

This application is based upon Japanese Patent Application No. 2001-311677, filed on Oct. 9, 2001, the contents of which are incorporated herein by reference.

BACKGROUND OF THE INVENTION

1. Field of the Invention

The present invention relates to a vehicle air conditioner, especially one which conditions the air in a vehicle in accordance with the amount of sunlight incident into a passenger compartment of the vehicle.

2. Related Art

In a conventional air conditioner, a target blowing temperature TAO of the air blown into the passenger compartment is calculated for conditioning the air in the vehicle in association with detected signals indicative of sensors, positioned in various places of the vehicle, such as an inside air temperature sensor, an outside air temperature sensor, or a sunlight amount sensor. Then, the air conditioner calculates a control value based on the TAO for controlling an actuator such as a servo motor which rotates a switching door and a blower fan which determines the amount of the blown air.

Namely, the air conditioner automatically controls the temperature of the air blown into the passenger room, the amount of the blown air, and a blow-out mode based on the value obtained from the TAO which is determined by the detected signals from the sensors that are inputted to a controller as well as a preset temperature inputted by the passenger.

When one of the detected signals changes, the air conditioner may change the temperature of the air blown into the passenger room, the amount of the blown air, and the blow-out mode. Typically, the amount of sunlight changes frequently according to the change in the traveling direction of the vehicle. For calculating the TAO by precisely detecting the changeable amount of the sunlight, a method for detecting the amount of the sunlight with time delay by applying the time constant to the detected value of the sunlight amount has been employed. Therefore, the TAO is calculated after the predetermined time elapses.

FIG. 1A shows a case of a traveling pattern of the vehicle where the vehicle changes a traveling direction from a first direction in which the vehicle receives the sunlight from its rear side to a second direction in which the vehicle receives the sunlight from its left side after traveling in the first direction about 10 seconds, and keeps the second direction for a while (about 20 seconds in this case), then, the vehicle changes again its traveling direction to the direction in which the vehicle receives the sunlight from its rear side. When the air is conditioned using the above-described method while the vehicle is receiving the sunlight from the left side in this case, the air conditioning will not be performed because of the time delay in changing the TAO even if a passenger positioned the left side in the vehicle feels uncomfortable by increase of his/her skin temperature caused by the incident sunlight.

On the other hand, when the air is conditioned using a conventional method without the time delay in calculating the TAO, that is, the conditioning of the air, especially the amount of the blown air Va is changed immediately after the amount of the sunlight changes as shown in FIG. 1B, the increase of the skin temperature can be suppressed while receiving the incident sunlight and a temperature sensation can be kept at a satisfactory level. However, the temperature sensation is not good enough for the passenger because the amount of the blown air Va is changeable relatively in a short time in accordance with change in the target blowing temperature TAO calculated by using detected sunlight amount that is very changeable.

SUMMARY OF THE INVENTION

An object of the invention is to provide an improved vehicle air conditioner that controls air conditioning comfortably.

According to a first aspect of the present invention, the air conditioner conditions the air based on the amount of sunlight that has a value before changing when the change in the amount of sunlight is equal to or less than a predetermined amount.

When the change in the amount of sunlight is small such that the temperature sensation level does not change to an uncomfortable level, the air conditioner keeps a condition before the amount of sunlight changed by using a fixed value of the amount of sunlight. Therefore, the temperature sensation is not influenced because the amount of blown air can be kept at a condition before the amount of sunlight changed.

According to another aspect of the present invention, when the situation where the change in the amount of sunlight is lower than the predetermined amount is kept for a predetermined time, the air conditioner conditions the air using the updated amount of sunlight based on information detected by a sunlight amount detector. Namely, in a situation where the amount of sunlight changes frequently in a short time, the amount of the blown air is kept at a condition before the amount of sunlight changed.

According to another aspect of the present invention, when the change in the amount of sunlight exceeds the predetermined amount in such a level that the skin temperature of the passenger to whom the sunlight is incident increases so that the temperature sensation becomes an uncomfortable level, the air conditioner controls the blow-out direction of the conditioned air so that the conditioned air is blown toward a passenger to whom the sunlight is incident.

According to another aspect of the present invention, by using a navigation system for performing the travel guide of a vehicle by detecting a current position and a traveling direction of the vehicle and using them and information previously memorized, the amount of sunlight incident into the vehicle can be obtained in accordance with the present data and the present time. Also, the change in the amount of sunlight can be obtained.

The navigation system obtains the location of the sun in accordance to the present data and the present time, obtains the sunlight direction based on the location of the sun and the road information, and obtains the amount of sunlight incident into the vehicle in association with the direct incident sunlight amount that reaches the ground based on the location of the sun.

A controller in the air conditioner controls air conditioning by using a fixed value of the amount of sunlight when change in the amount of sunlight is equal to or lower than a predetermined amount that is obtained by the navigation system while the sunlight is incident into the vehicle.

Preferably, a navigation controller in the navigation system and a controller for the air conditioner are constituted in a common computing device so that the data processing is performed promptly.

Other features and advantages of the present invention will become more apparent from the following detailed description made with reference to the accompanying drawings.

BRIEF DESCRIPTION OF THE DRAWINGS

FIG. 1B is a diagram different from that shown in FIG. 1A showing characteristics indicative of factors relating to air conditioning in the vehicle of the traveling pattern of the vehicle of the related art;

FIG. 2 is a system diagram illustrating a construction of a ventilation system according to a first embodiment of the present invention;

DETAILED DESCRIPTION OF THE PREFERRED EMBODIMENT

Figure 1A:
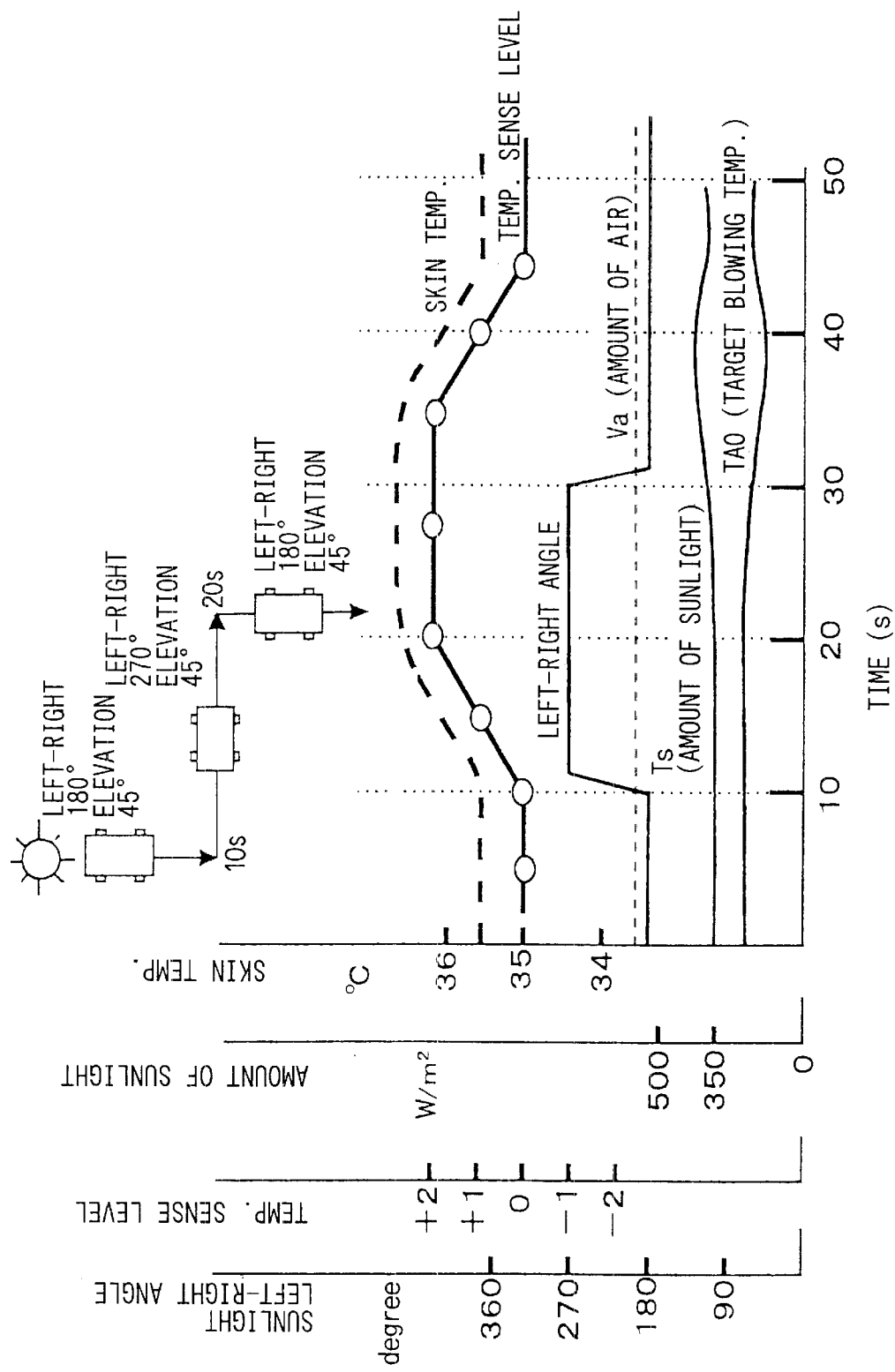
FIG. 1A is a diagram showing characteristics indicative of factors relating to air conditioning in a vehicle of a traveling pattern of the vehicle of the related art.

Specific embodiments of the present invention will now be described hereinafter with reference to the accompanying drawings in which the same or similar component parts are designated by the same or similar reference numerals.

(First Embodiment)

A schematic ventilation system in which air is blown toward a passenger compartment of a vehicle will be described with reference to FIG. 2. The ventilation system has an air conditioning unit body 20, sensors 52, 53, 54 each of which is positioned in a respective part of the vehicle, an operational panel, an air-conditioning controller 40 and the like.

The air conditioning unit body 20 is a so-called front-rear and left-right side independent temperature control type such that the vehicle is divided into four areas to control air conditioning independently from each other. Also, this invention can be adopted to another type of an air conditioner such as a left-right side independent temperature control type or a front-rear independent temperature control type. The air conditioning unit body 20 is provided under an instrument panel in the vehicle. The air conditioning unit body 20 has an inside/outside air switching box 210 at its upstream side. The inside/outside air switching box 210 has an inside air inlet 211, an outside air inlet 212 and an inside/outside switching door 213 provided between the inlets 211 and 212 that selectively opens/closes the inside air inlet 211 and the outside air inlet 212. The inside/outside switching door 213 is driven by an electric-drive apparatus such as a servomotor (not shown).

A centrifugal type electrical air blower unit 220 is provided at an outlet of the inside/outside air switching box 210 as an air blowing means. The air blower unit 220 has a centrifugal blower fan 221 and a driving motor 222 for driving the blower fan 221 and a scroll casing 223 which accommodates the fan 221. connected to a rotor shaft of the blower-driving motor 222. The blower voltage applied to the blower motor 222 is controlled by a blower motor controller as an activation means (not shown).

An air conditioning case 230 of the air conditioning unit body 20 is connected to an air outlet side of the scroll casing 223. An evaporator 231 as an air cooling means and a heater core 232 as an air heating means are provided in the case 230. The heater core is located at a downstream side with respect to the evaporator 231. A partition plate 233 is provided at an upstream side of the heater core 232. A first bypass passage 234a and a second bypass passage 234b for bypassing the heater core 232 are provided in the case 230 at both sides (top and bottom sides in FIG. 2) of the heater core 232.

At an upstream side of the heater core 232, a first and a second air mix doors 235a and 235b are provided. A first and a second servo motor are coupled with respective air mix doors 235a and 235b as an activation means (not shown). A respective servo motor has a potentiometer (not shown) to detect the position of a respective door 235a or 235b by detecting a rotated angle of an output shaft of the respective motor.

A ratio between the cooled air passing through the heater core 232 located upper side of the partition plate 233 and the cooled air passing through the first bypass passage 234a is adjusted by the opening degree of the first mix door 235a. Likewise, a ratio between the cooled air passing through the heater core 232 located lower side of the partition plate 233 and the cooled air passing through the second bypass passage 234b is adjusted by the opening degree of the second mix door 235b. The air mix door 235a is a door for controlling the temperature of the conditioned air blown toward a front-seat side and the air mix door 235b is a door for controlling the temperature of the conditioned air blown toward a rear-seat side.

The evaporator 231 is a heat exchanger and constitutes a well-known refrigeration cycle with a compressor, a condenser, a receiver and a decompressor (not shown) connected by pipes so as to cool the air in the air conditioning case 230 by drying the air. The compressor is connected to an engine of the vehicle through an electromagnetic clutch (not shown) for control of an activation and a non-activation states by connecting and disconnecting the electromagnetic clutch.

The heater core 232 is a heat exchanger using engine cooling water as a heat source, for heating the air cooled by the evaporator 231.

A front/rear air-distribution adjusting door 236 is a door for adjusting distribution ratio between the conditioned air blown into a front-seat side and the conditioned air blown into a rear-seat side. A servo motor (not shown) is connected to the front/rear air-distribution adjusting door 236 as an activation means. When the front/rear air-distribution adjusting door 236 is rotated toward a lower side of the figure, the amount of the conditioned air blown into the front-seat side is relatively increased with respect to the rear-seat side.

At an air-outlet side of the air conditioning case 230, a front side FACE duct 237a and a front side FOOT duct 238a are connected. The duct 237a leads the conditioned air, which is conditioned in accordance with the opening degree of the first air mix door 235a, to a FACE side of the front-seat side, while the duct 238a leads the conditioned air to a FOOT side of the front-seat side. Moreover, a rear side FACE duct 237b and a rear side FOOT duct 238b are also connected. The duct 237b leads the conditioned air, which is conditioned in accordance with the opening degree of the first air mix door 235b, to a FACE side of the rear-seat side, while the duct 238b leads the conditioned air to a FOOT side of the rear-seat side.

The front side FACE duct 237a is divided into a front left-side FACE duct 239a and a front right-side FACE duct 240a at a downstream side thereof. The front left-side FACE duct 239a is divided into a front left-side CENTER FACE duct 241a and a front left-side SIDE FACE duct 242a at the end thereof. The front right-side FACE duct 240a is divided into a front right-side CENTER FACE duct 243a and a front right-side SIDE FACE duct 244a at the end thereof. Also, the rear side FACE duct 237b is divided into a rear left-side FACE duct 239b and a rear right-side FACE duct 240b at a downstream side thereof. The rear left-side FACE duct 239b is divided into a rear left-side CENTER FACE duct 241d and a rear left-side SIDE FACE duct 242d at the end thereof. The rear right-side FACE duct 240b is divided into a rear right-side CENTER FACE duct 243d and a rear right-side SIDE FACE duct 244d at the end thereof.

The front side FOOT duct 238a is divided into a front left-side FOOT duct 245a and a front right-side FOOT duct 246a at the end thereof. The rear side FOOT duct 238b is divided into a rear left-side FOOT duct 245b and a rear right-side FOOT duct 246b at the end thereof.

The duct 241a and duct 242a respectively have a CENTER FACE blow-out port 241c and a SIDE FACE blow-out port 242c at a respective end thereof to blow out the conditioned air toward an upper body of the passenger seated at a front-left side of the vehicle. The duct 243a and duct 244a respectively have a CENTER FACE blow-out port 243c and a SIDE FACE blow-out port 244c to blow out the conditioned air toward an upper body of the passenger seated at a front-right side of the vehicle.

The duct 241d and duct 242d respectively have a CENTER FACE blow-out port 241b and a SIDE FACE blow-out port 242a at a respective end thereof to blow out the conditioned air toward an upper body of the passenger seated at a rear-left side of the vehicle. The duct 243b and duct 244b respectively have a CENTER FACE blow-out port 243b and a SIDE FACE blow-out port 244b to blow out the conditioned air toward an upper body of the passenger seated at a rear-right side of the vehicle.

The CENTER FACE blow-out ports 241c, 243c, 241b and 243b and the SIDE FACE blow-out ports 242c, 244c, 242a and 244b each of them has a swing mechanism that can change a blow-out direction of the conditioned air. The swing mechanism is controlled by an air conditioning control device 40.

The FOOT duct 245a and FOOT duct 246a respectively have a FOOT blow-out port 245c and 246c at a respective end thereof to blow out the conditioned air toward a foot portion of the passenger seated at the front side of the vehicle. Likewise, the FOOT duct 245b and FOOT duct 246b respectively have a FOOT blow-out port 245d and 246d at a respective end thereof to blow out the conditioned air toward a foot portion of the passenger seated at the rear side of the vehicle.

A defroster duct 247 is connected to the end of the air conditioning case 230, that has a defroster blow-out port 247d to blow out the conditioned air toward an inner surface of a windshield of the vehicle.

The front side FACE duct 237a, the rear side FACE duct 237b, front side FOOT duct 238a, the rear side FOOT duct 238b and the defroster duct 247 have a front side FACE door 248a, a rear side FACE door 248b, a front side FOOT door 249a, a rear side FOOT door 249b and a defroster door 250, respectively, at an air inlet side thereof to open/close it.

A front side air-distribution adjusting door 251a is provided at a connecting point between the front left-side FACE duct 239a and the front right-side FACE duct 240a to adjust the air-distribution rate of the conditioned air between the front left-side FACE duct 239a and the front right-side FACE duct 240a. Likewise, a rear side air-distribution adjusting door 251b is provided at a connecting point between the rear left-side FACE duct 239b and the rear right-side FACE duct 240b.

Also, a front side air-distribution adjusting door 252a is provided at a connecting point between the front left-side FOOT duct 245a and the front right-side FOOT duct 246a to adjust the air-distribution rate of the conditioned air between the front left-side FOOT duct 245a and the front right-side FOOT duct 246a. Likewise, a rear side air-distribution adjusting door 252b is provided at a connecting point between the rear left-side FOOT duct 245b and the rear right-side FACE duct 246b.

The front side FACE door 248a, the front side FOOT door 249a, a rear side FACE door 248b and the rear side FOOT door 249b are connected to a servo motor (not shown) as an activation apparatus, respectively. The defroster door 250, the front side air-distribution doors 251a, 252a, and the rear side air-distribution doors 251b, 252b are connected to a respective servo motor (not shown) as an activation apparatus.

As described above, the air-distribution rate of the conditioned air that is blown out toward four passenger's seats in a front-left, a front-right, a rear-left and a rear-right side can be controlled individually by controlling a rotate position of each the front/rear air-distribution adjusting door 236, the front side air-distribution adjusting doors 251a and 252a, and the rear side air-distribution adjusting doors 251b and 252b.

Next, as a main feature in this embodiment, an air conditioning control device 40 will be described. The air conditioning control device 40 outputs control signals to respective actuators such as a blower motor controller and the servo motors described above to control the blow-out of the conditioned air.

The air conditioning control device 40, which controls the air conditioning unit body 20 provided as the front-rear and left-right side independent temperature control type, is provided so as to input detected signals indicative of the environmental conditions of the vehicle such as an inside air temperature of the vehicle detected by an inside air temperature sensor 52, an outside air temperature of the vehicle detected by an outside air temperature 54, the amount of sunlight that is incident into the vehicle and detected by a sunlight amount sensor 53, an evaporator temperature detected by an evaporator temperature sensor (not shown), a water temperature of the cooling water (not shown), signals from the instrumental panel 56 that are indicated by the user and indicative of an activation mode, a preset temperature or the like, and signals sent from the potentiometers described above (not shown in the figure), and so as to control a respective temperature of the conditioned air blown out from the respective blow-out ports, the amount of the blown air from the respective blow-out ports and the blow-out mode at each passenger's seat by controlling each actuator such as the servo motors for opening/closing the doors, the blower motor, or the like.

In this embodiment, the sunlight amount sensor 53 has two elements including a photo diode (in either discrete chips or an integrated chip) for detecting the amounts of sunlight incident from the left side and the right side of the vehicle. Moreover, two sunlight amount sensors 53 are respectively provided at the front side and the rear side of the vehicle to detect the amount of sunlight at each portion corresponding to respective four passenger's seats. Based on the amount of sunlight detected at each of four portions corresponding to respective four passenger's seats, an incident direction of sunlight with respect to a traveling direction of the vehicle can be schematically calculated.

A selection switch (not shown) for selecting the activation mode in which the air conditioning status such as the amount of the blown air and the temperature is individually controlled in each passenger's seat is provided in the instrumental panel 56. For example, by setting the number of the passengers sitting on the seats, a three-seat individual temperature control activation in which air conditions of a triple zone indicating, for example, the front-left seat, the front-right seat and the rear seat side can be controlled, or a four-seat individual temperature control activation in which air conditions of a tetra zone including four seats (front-left, front-right, rear-left and rear-right) can be controlled can be selectable. An activation switch of the rear cooler for determining the air conditioning at the rear seat side of the vehicle is provided (not shown).

The air conditioning control device 40 is conventional so as to contain an A/D converter, a microcomputer and the like. The signals from the sensors and the potentiometers are converted by the A/D converter, and then, inputted to the microcomputer. The microcomputer has a well-known structure including a CPU, a ROM, a RAM, a standby RAM portion, an I/O port, and the like, and supplied the power from a battery when an ignition switch is turned on.

Next, an air conditioning sequential program for controlling activations of the actuators based on the signals after the ignition switch is turned on will be described with reference to a block diagram shown in FIG. 3 and a flow-chart shown in FIG. 4

Figure 3:
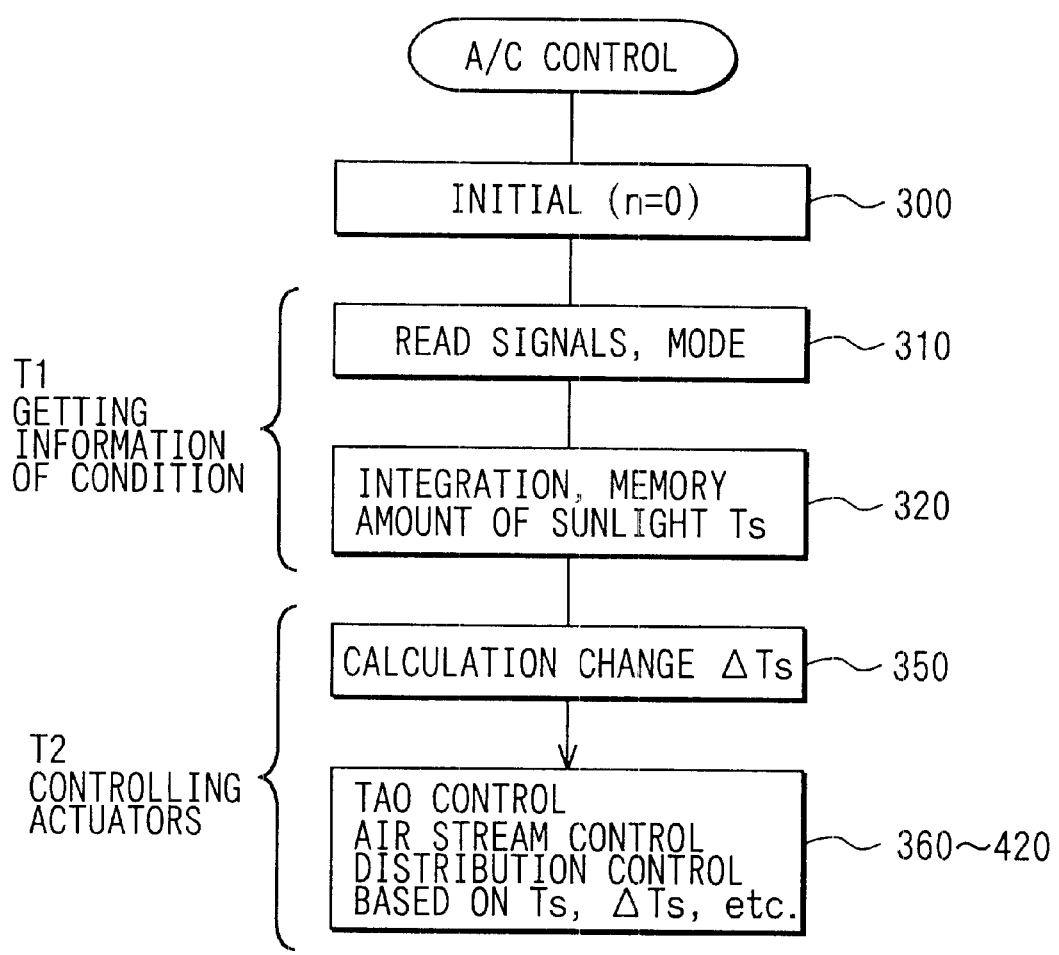
FIG. 3 is a flow chart showing an air conditioning control of the first embodiment of the present invention.

A cycle of a data-interruption for a control process of the air conditioning program is set as shown in FIG. 3 so that a cycle for reading, integrating and memorizing of input signals detected by the sensors, sent from the potentiometers and sent from the instrumental panel is performed at every T1 (for example, 250 milli-seconds), and a cycle for controlling the actuators based on the processed data is performed at every T2 (for example, 4 seconds).

When an air conditioning activation switch (not shown) is turned on, memorized contents in the data processing memory (RAM) are initialized, and the number of repeating times "n" is set at zero (0) at step 300.

Next, the signals indicative of the environmental conditions such as an inside air temperature Tr detected by the inside air temperature sensor 52, an outside temperature Tam detected by the outside air temperature sensor 54, the amounts of sunlight detected by the sunlight amount sensors 53, a set temperature Tset set by the passenger and the like are input at step 310. An activation mode having, for example, the four-seat individual temperature control state and a non-activation state of the rear cooler is input at this step. With regard to the amount of sunlight, each data indicative of a condition at the respective front-left, front-right, rear-left and rear-right seat is read every cycle of 250 ms.

The amount of the sunlight read every cycle of 250 ms is integrated and memorized at step 320. More specifically, sixteen data read every 250 ms, that are obtained in a time period corresponding to the cycle T2 are integrated and averaged to be memorized. The average value of the sunlight amount data in the previous T2 cycle and the average value in the current T2 cycle are memorized distinctly from each other. Hereinafter, the average value in the previous T2 cycle and the average value in the current T2 cycle will be referred to as a pre-change sunlight amount Ts1, and a post-change sunlight amount Ts2, respectively.

Figure 4:
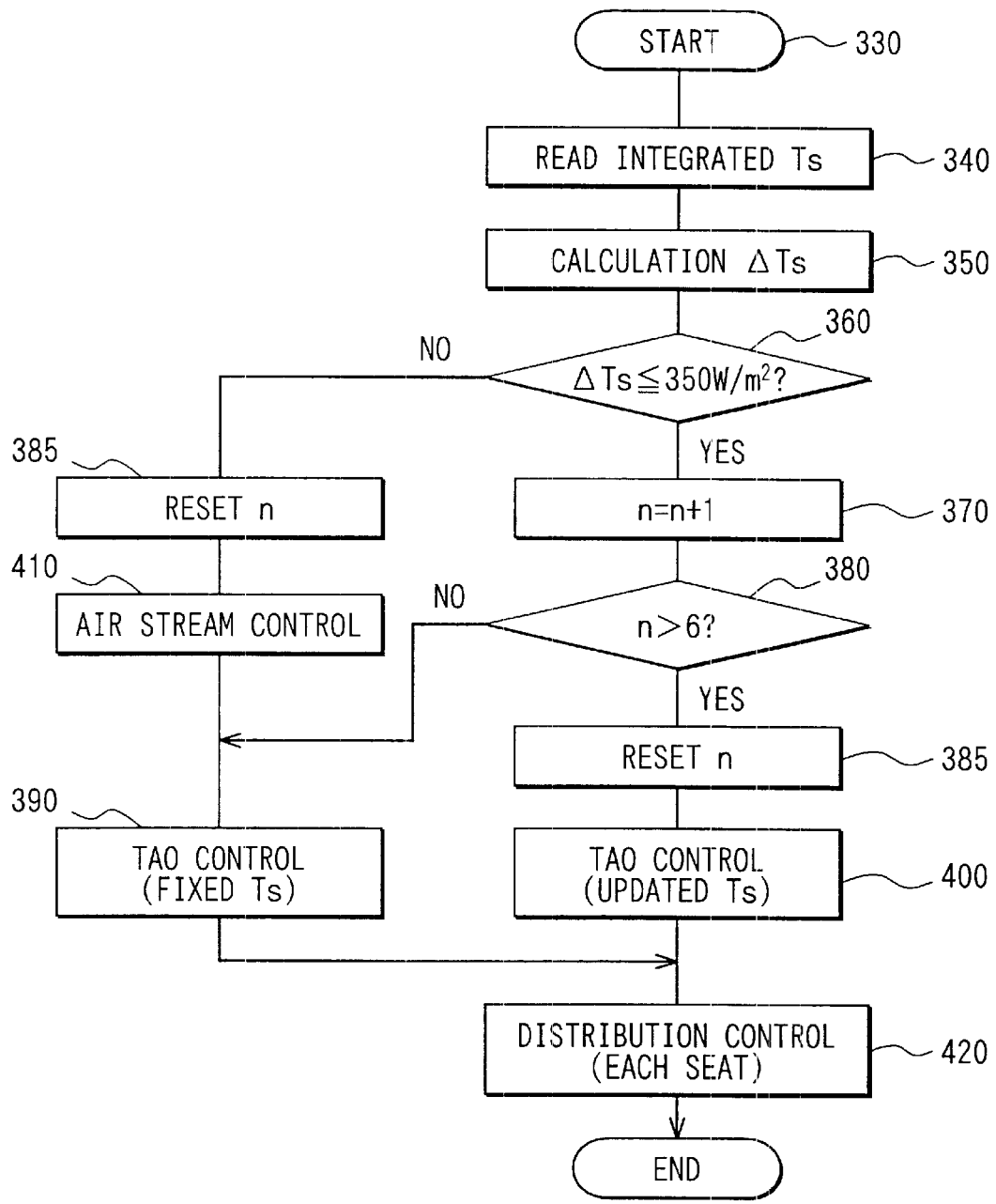
FIG. 4 is a detailed flow chart showing a main feature of the air conditioning in the first embodiment of the present invention.

Next, an air conditioning control in which the actuators are controlled in association with the amount of sunlight will start as shown in FIG. 4 (step 330).

In step 340, the pre-change sunlight amount Ts1 and the post-change sunlight amount Ts2 are read. In step 350, a sunlight change amount ΔTs different between the Ts1 and Ts2 is calculated. In this embodiment, the Ts1 and Ts2 are obtained from the four portions corresponding to the four seats. Therefore, the sunlight change amount ΔTs is obtained by, for example, averaging a change amount in the front-left side and the front-right side and a change amount in the rear-left side and the rear-right side.

Then, it is determined whether or not the sunlight change amount ΔTs is equal or lower than a predetermined value (for example, 350 W/m$^2$) at step 360 as a sunlight change amount determining means. This predetermined value is set at a value where the passenger who receives the sunlight does not feel uncomfortable at the temperature sensation level.

When the amount of sunlight Ts changes to have a value causing uncomfortable feeling of the passenger, it is determined that the sunlight change amount ΔTs exceeds the predetermined value and it is determined to perform an air conditioning provided in step 410. On the other hand, when the amount of sunlight Ts changes to have a value not causing uncomfortable feeling of the passenger, an air conditioning based on a control of a target blowing temperature TAO is performed at step 390 by fixing and using the pre-change sunlight amount Ts1 rather than using the post-change sunlight amount Ts2 during a predetermined time.

After the predetermined time elapsed, it is cleared to fix the control value to the pre-change sunlight amount Ts1, and then, an air conditioning based on the control of a target blowing temperature TAO is performed by using the post-change sunlight amount Ts2 so that a normal process is performed at step 400.

The predetermined time described above is obtained by, for example, counting the repeating number n of the cycle T2 (4 sec, for example) and converting it into time period (step 370 and 380) In this embodiment, the air conditioning at step 390 is continued until the repeating number n exceeds 7 (for example, 28 sec). After the repeating number n exceeds 7, the air conditioning at step 400 is performed. The repeating number n is reset at step 385 before the air conditioning at steps 400 and 410.

With this feature described above, when the amount of sunlight Ts changes to have the value not causing uncomfortable feeling of the passenger at the temperature sensation level even though it changes frequently, the air conditioning is performed according to the pre-change sunlight amount Ts1 by fixing the control value to the Ts1 during the period of the predetermined time.

Next, the air conditioning according to the target blowing temperature TAO based on the pre-change sunlight amount Ts1 will be described (step 390). The target blowing temperature TAO is used to determine the temperature and the amount of the air blown from each blow-out port, and blow-out mode. The TAO is obtained by following equation.

The activation mode, the inside air temperature Tr, the outside air temperature Tam, the preset temperature Tset (front seat, rear seat), each of which is read at step 310, and the pre-change sunlight amount Ts1 read at step 340 are used. In this embodiment, a front target blowing temperature TAO(front) of the front seat side and a rear target blowing temperature TAO (rear) of the rear seat side are obtained. The amount of sunlight Ts is obtained at the front seat side and the rear seat side, respectively. Moreover, the amount sunlight Ts is obtained as an average value between those of the left side and the right side.

$$TAO(\text{front}) = K\text{set} \times T\text{set}(\text{front}) - Kr \times Tr - Kam \times Tam - Ks \times Ts(\text{front}) + Kd(\text{front}) \times (T\text{set}(\text{front}) - T\text{set}(\text{rear})) + C \quad (1)$$

$$TAO(\text{rear}) = K\text{set} \times T\text{set}(\text{rear}) - Kr \times Tr - Kam \times Tam - Ks \times Ts(\text{rear}) + Kd(\text{rear}) \times (T\text{set}(\text{rear}) - T\text{set}(\text{front})) + C \quad (2)$$

wherein, each Kset, Kr, Kam, Ks, Kd(front) and Kd(rear) represents a gain. The C is a correction constant.

The blower voltage, a control value of the rotation degree for each first and second air mix doors 235a and 235b, and the other doors are output to each actuator based on the TAOs obtained by the equations described above. The control value based on the Ts does not change because the Ts is fixed to the pre-change sunlight amount Ts1. Therefore, the air conditioning in which the blowing out temperature and the amount of the blown air are kept the values before the amount of sunlight Ts changes is performed even if it changes.

Next, the air conditioning at step 400 will be described. In this step, the fix of the control value (i.e., the Ts in the equations (1), (2)) to the pre-change sunlight amount Ts1 is cleared, and the TAOs described above are calculated using the post-change sunlight amount Ts2. Therefore, the control value relating to the amount of sunlight changes based on the post-change sunlight amount Ts2 to thereby causing change in the blowing temperature or the amount of the blown air.

Next, the air conditioning at step 410 will be described. When the amount of sunlight Ts changes to have the value causing uncomfortable feeling to the passenger at the temperature sensation level, an air stream control in which the conditioned air is blown toward the passenger to whom the sunlight is incident is performed.

More specifically, the conditioned air is blown toward the upper body of the passenger to whom the sunlight is incident by controlling the swing mechanism (not shown) provided at the CENTER FACE blow-out ports 241c, 243c, 241d and 243d, and the SIDE FACE blow-out ports 242c, 244c, 242d and 244d. The determination of the passenger to whom the sunlight is incident is performed by reading the pre-change sunlight amount Ts1 and the post-change sunlight amount Ts2 at the respective four portions corresponding to the front-left seat, the front-right seat, the rear-left seat, and the rear-right seat at step 340, obtaining the sunlight change amount ΔTs at each passenger's seat, selecting the seat position where the sunlight change amount ΔTs exceeds the predetermined value, for example, 350 W/m$^2$. Then, the swing mechanism is controlled to blow the conditioned air to the passenger(s) sitting on that seat(s).

Incidentally, the amount of blown air does not change since the air conditioning is performed using the value fixed to the pre-change sunlight amount Ts1 at step 390.

When the vehicle turns to change its traveling direction, there is a situation where the sunlight is incident into the vehicle for only a little while (20 sec, for example) and a situation where the sunlight is incident into the vehicle for a long time. Air conditionings in these situations will be described with reference to FIGS. 5A and 5B.

Figure 5A:
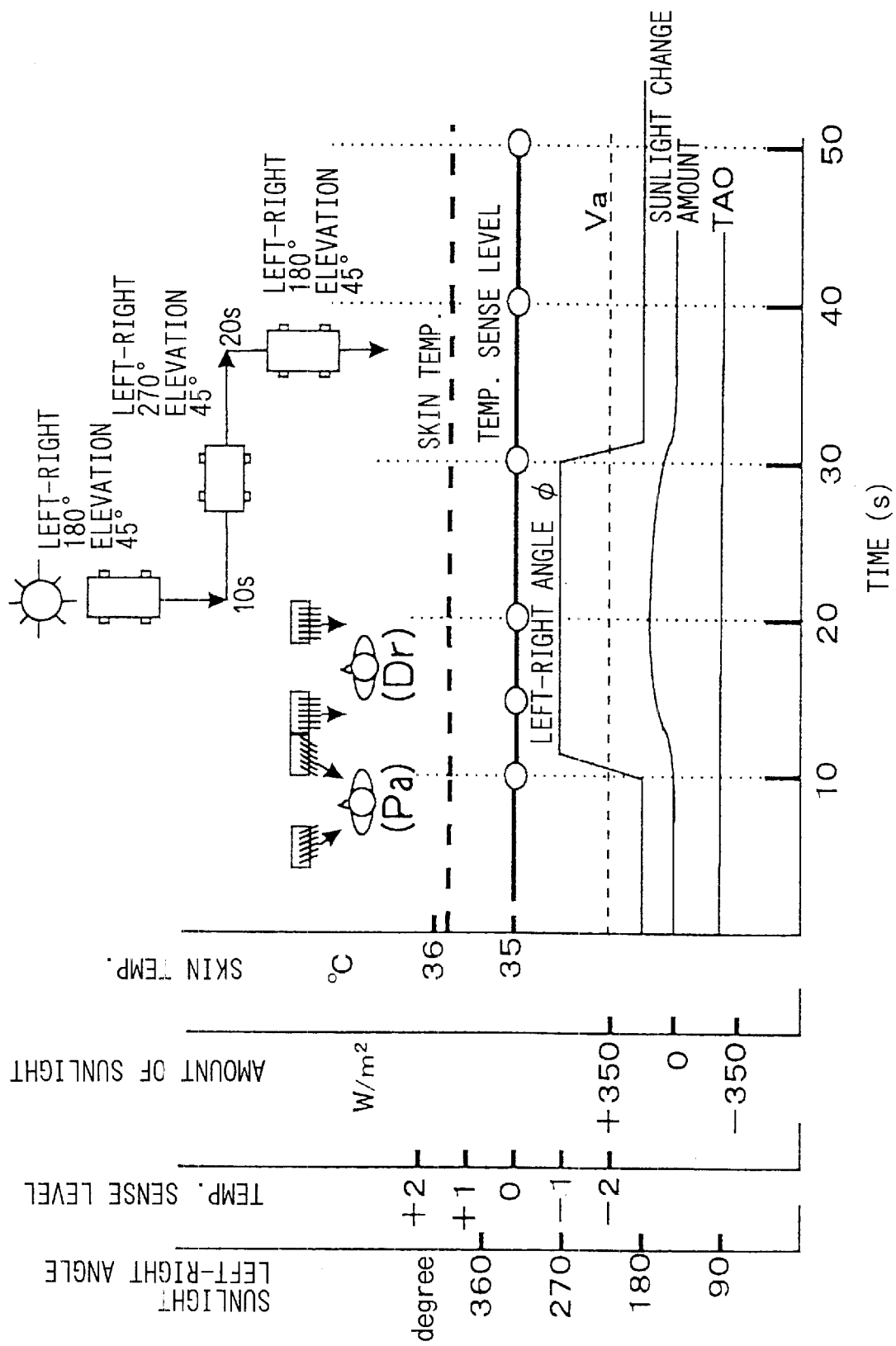
FIG. 5A is a diagram showing characteristics indicative of factors relating to air conditioning in a vehicle of a traveling pattern of the vehicle in the first embodiment of the present invention.

In FIG. 5A, a situation where the traveling direction of the vehicle changes from the direction in which the sun is positioned behind the vehicle to the direction in which the sunlight is incident into a passenger's seat Pa for 20 sec after turning left, and the air stream control (step 410) is shown as a case when the sunlight change amount ΔTs exceeds the predetermined value. According to this situation, the increase in skin temperature of the passenger seated at passenger's seat Pa who receives the sunlight is restrained by blowing out the conditioned air toward this passenger without changing the blowing amount of the conditioned air Va so that the temperature sensation level of the passenger is satisfied.

Figure 5B:
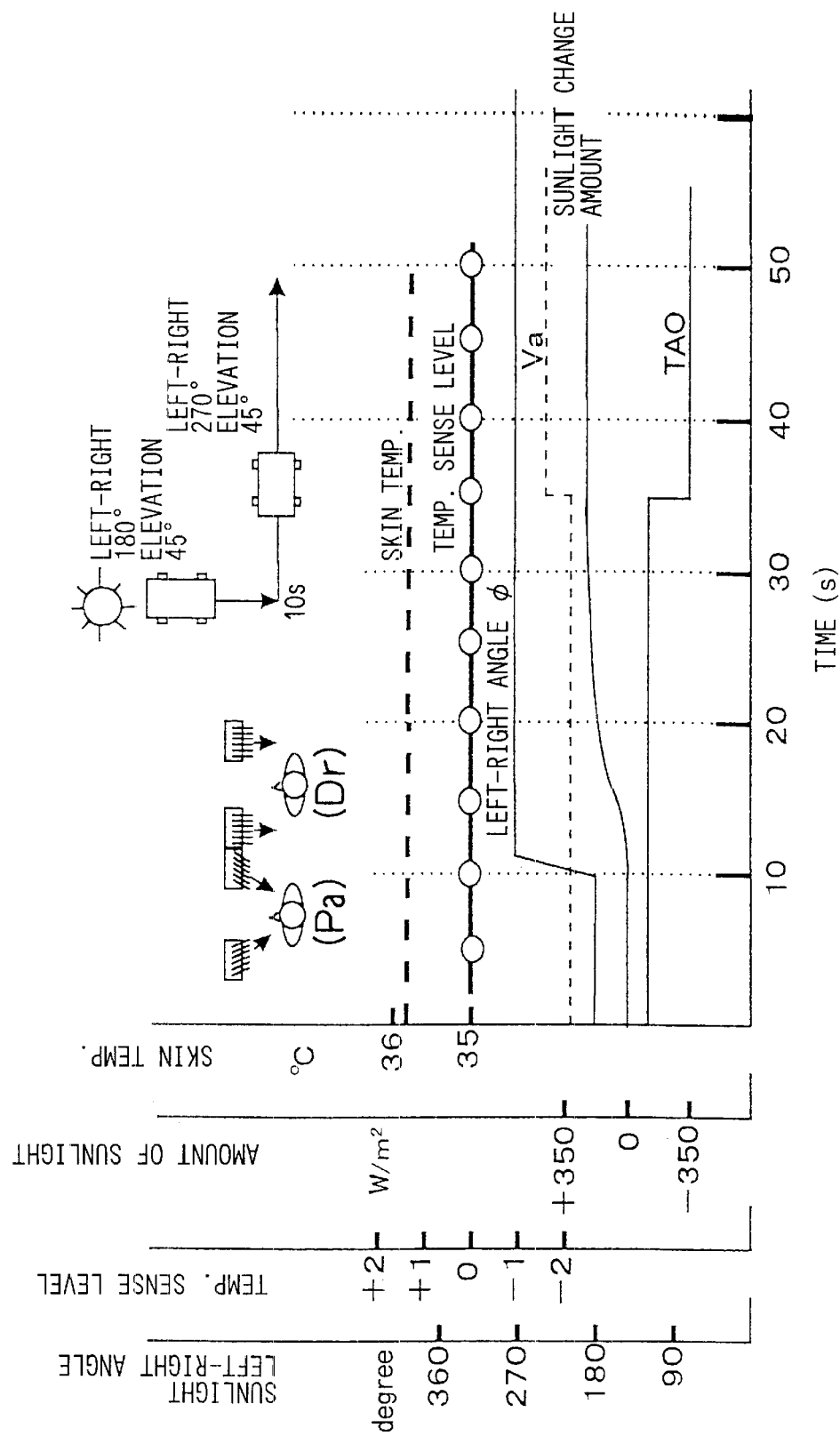
FIG. 5B is a diagram different from that shown in FIG. 1A showing characteristics indicative of factors relating to air conditioning in the vehicle of the traveling pattern of the vehicle in the first embodiment of the present invention.

In a case shown in FIG. 5B, after changing the traveling direction (after 10 seconds has elapsed), the air stream control in which the conditioned air is blown toward the passenger to whom the sunlight is incident is continued for the predetermined time period to keep the temperature feeling of the passenger. After the predetermined time has elapsed, the increase in skin temperature of the passenger seated at passenger's seat Pa who receives the sunlight can be restrained by performing the air conditioning at step 400 in which the blowing amount of the conditioned air Va changes based on the target blowing temperature TAO which is obtained using the post-change sunlight amount Ts2 so that the temperature sensation level of the passenger is satisfied.

The distribution of the blowing amount of the conditioned air is controlled at step 420. The distribution of the air is performed in accordance with the post-change sunlight amount Ts2 at the four positions in the vehicle corresponding to every seat in the front-left, front-right, rear-left and rear-right. This is performed by controlling the rotational position of the front-rear air distribution adjusting door 236, the front left-right air distribution adjusting doors 251*a* and 252*a* and the rear left-right air distribution adjusting doors 251*b* and 252*b* based on the blowing air distribution ratio obtained using the post-change sunlight amount Ts2 at each position. With this distribution control, the blowing air distribution ratio at each passenger's seat is controlled independently. The amount of the distributed air becomes higher at the passenger's seat than at the other seats.

As described above, when the sunlight change amount ΔTs does not exceed the predetermined value causing the uncomfortable feeling of the passenger, the amount of sunlight Ts is fixed to the pre-change sunlight amount Ts1, and the air conditioning in which the target blowing temperature TAO is obtained using the pre-change sunlight amount Ts1 and the amount of the blown air is kept at the same value before the amount of sunlight Ts changes, is performed. Therefore, the uncomfortable feeling of the passenger at the temperature sensation level is not caused as compared to the conventional air conditioning in which the amount of the blown air toward the passenger changes according to change in the amount of sunlight Ts.

When the situation where the sunlight change amount ΔTs is lower than the predetermined value continues for the predetermined time, in other words, the time until the sunlight change amount ΔTs becomes stable has elapsed, the air conditioning is performed based on the post-change sunlight amount Ts2 instead of using the pre-change sunlight amount Ts1. Therefore, until the sunlight change amount ΔTs has become stable while the amount of sunlight Ts changes frequently, the air conditioning is continued to keep the same condition with respect to the blowing amount of the conditioned air as that before the amount of sunlight Ts changes frequently, and then, after the sunlight change amount ΔTs becomes stable, the air conditioning is performed using the Ts2.

When the sunlight change amount ΔTs exceeds the predetermined value at which the uncomfortable feeling of the passenger in the temperature sensation level may occur, the increase in skin temperature of the passenger seated at passenger's seat Pa who receives the sunlight is restrained by performing the air conditioning in which the conditioned air is blown toward the passenger so that the temperature sensation level of the passenger does not become the uncomfortable state.

The distribution control of the blowing air in association with the amount of sunlight Ts at every seat increases the blowing amount of the conditioned air to the passenger who receives the sunlight so as to restrain the increase in skin temperature of the passenger.

(Second Embodiment)

In the first embodiment, the amount of sunlight Ts in every seat position is detected by two sunlight sensors 53. Moreover, the air conditioning in response to the situation where the amount of sunlight Ts changes frequently is discussed. In this embodiment, the amount of sunlight Ts is obtained by a navigation system. Moreover, the air conditioning performed based on the information including the amount of sunlight and road information that is input to the air conditioning control device 40 will be described.

In the first embodiment, the cycle T1 in which the signals and the activation mode are read and the cycle T2 in which the actuators are controlled are provided. In this second embodiment, the control process for reading the signals and the activation mode in the cycle T1 is performed in the navigation system capable of processing huge amounts of information in these days. Therefore, the calculating process and the memorizing process are performed promptly in the navigation system. Accordingly, the air conditioning control device 40 can be an air conditioning activation device which receives an order from the navigation system to perform the control of the actuators.

Figure 6:
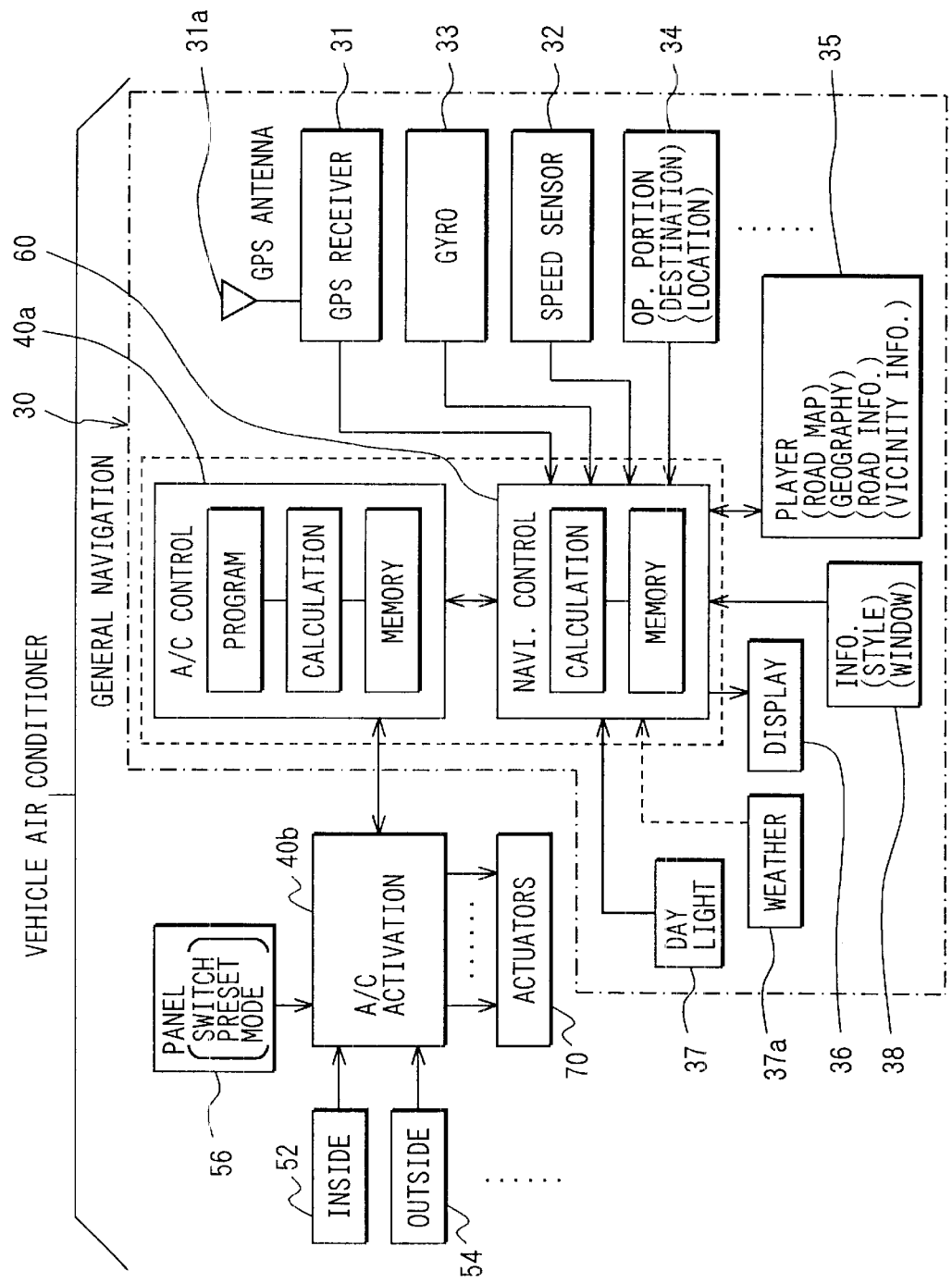
FIG. 6 is a system diagram showing an air conditioner in the vehicle that includes a navigation system and an air conditioner of a second embodiment of the present invention.

As shown in FIG. 6, a control device of the air conditioning apparatus for the vehicle includes a navigation system control portion 60 for calculating the amount of sunlight Ts incident into the vehicle according to its traveling direction, an air conditioning control portion 40*a* for calculating a control amount of an air conditioning program based on a signal sent from each sensor and a calculating result obtained at the navigation system control portion 60, an air conditioner activating device 40*b* for activating each actuator based on the control amount obtained at the air conditioning control portion 40*a*.

The control device of the air conditioning apparatus for the vehicle will be described with reference to FIGS. 6 and 14. The navigation system control portion 60 and the air conditioning control means 40*a* are provided in a comprehensive navigation device 30, and performed by a DVD and the like capable of calculating and memorizing the huge amounts of information.

The navigation system control portion 60 obtains a sun position at the current date and the time, a sunlight direction (θ, φ) incident into the vehicle based on the sun position and the road information player 35 described later, and the amount of sunlight Ts incident into the vehicle with respect to the direct incident sunlight amount that reaches the ground based on the sun position.

The comprehensive navigation device 30 has a GPS antenna 31*a* for receiving radio waves transmitted from satellites for GPS (Global Positioning System), a GPS receiver 31 for calculating a current position, a traveling direction and the like of the vehicle, a vehicle speed sensor 32 for detecting a traveling speed of the vehicle, a gyro 33 for detecting change in the traveling direction of the vehicle, an operational portion 34 for inputting each operation by a user, the road information player 35 for reading road information from a DVD or a CD-ROM containing road information including a road map, an inclined angle of a road, a location and a height of a building around the road, a display 36, which is a CRT, a LCD or the like, for displaying the road map, the current position and the traveling direction of the vehicle, and the like, and a guiding device for supplying traveling guide to a driver by displaying the current position and the traveling direction of the vehicle, a target traveling direction and the like at the display 36 with the map.

A vehicle information input portion 38 and a daylight sensor 37 are provided. The vehicle information input portion 38 inputs to the navigation control portion 60 vehicle information for being used for calculating the sunlight direction incident into the vehicle, that include at least a style of the vehicle, a height position of a window, a type of a window, dimension in height of a passenger's seat and the like. The vehicle information can be installed in the navigation system control portion 60 when a car dealer, for example, installs the comprehensive navigation device 30 into the vehicle so that the user of the vehicle does not need to install it. The daylight sensor 37 detects light around the vehicle to turn on a headlight of the vehicle. Namely, the daylight sensor 37 serves as a daylight determination device which determines whether or not the detected illumination of the daylight exceeds a predetermined value, and determines that the vehicle receives daylight when the detected illumination exceeds the value. The weather information 37*a* can be input to the navigation system control portion 60 when a target traveling destination is input to determine a traveling route. The weather information 37*a* has a passage estimate time along the traveling route, weather, temperature, rainfall, the amount of a cloud, air pressure at a predetermined estimate time.

The road information player 35 includes, with respect to a current position and a traveling direction of the vehicle, the road information having at least traveling road information, height and location information of a building around the traveling road, geographic information of traveling road and an area around the traveling road, structure information of traveling road and an area around the traveling road or the like. For example, the road information includes height information of a building, height and size information of a noise-shielding wall provided at a road shoulder, road structure information of a road under an elevated road, a tunnel, or an underground passage in a city area, geographic information of a mountain, a valley or the like. That is, road information and height information of a building that shield the sunlight incident into the vehicle with respect to the traveling direction of the vehicle are included.

The road information player 35 constitutes a road information input means for determining whether or not a shielding object, such as a building which shields the sunlight incident into the vehicle with respect to the traveling direction of the vehicle, is present. The road information can be read from a DVD or a CD-ROM. Otherwise, the navigation control portion 60 gets the road information through a public information communicating network such as the Internet or a transport facilities communicating network.

The GPS receiver 31 is used for a so-called GPS navigation which determines the current position and the traveling direction of the vehicle based on radio waves from the satellites. The vehicle speed sensor 32 and the gyro 33 are used for conducting a so-called self navigation in which the traveling amount of the vehicle to detect the current position and the traveling direction of the vehicle and the like by updating them. This self navigation is used for correcting the current position and traveling direction of the vehicle determined by the information from the GPS receiver when the information from the GPS receiver is not normal because of the traveling in a tunnel or the like.

The air conditioning control portion 40*a* is used for performing the air conditioning program for a blow-out control of each blow-out port in the vehicle based on the amount of sunlight Ts obtained by the navigation control portion 60 and the detected signals from the inside air temperature sensor 52, the outside air temperature 54 and the like when the sunlight is incident into the vehicle, and indicates the control amount of each actuator in the air conditioning apparatus to the air conditioner activation device 40*b*.

The air conditioner activation device 40*b* inputs the detected signals from the sensors 53, 54 and the like and the indicating signals from the operational panel 56, outputs them to the air conditioning control portion 40*a*. The air conditioner activation device 40*b* sends a control signal to each actuator 70 such as the blower motor controller and the servomotor based on the control amount from the air conditioning control portion 40*a* to control each actuator.

Figure 7:
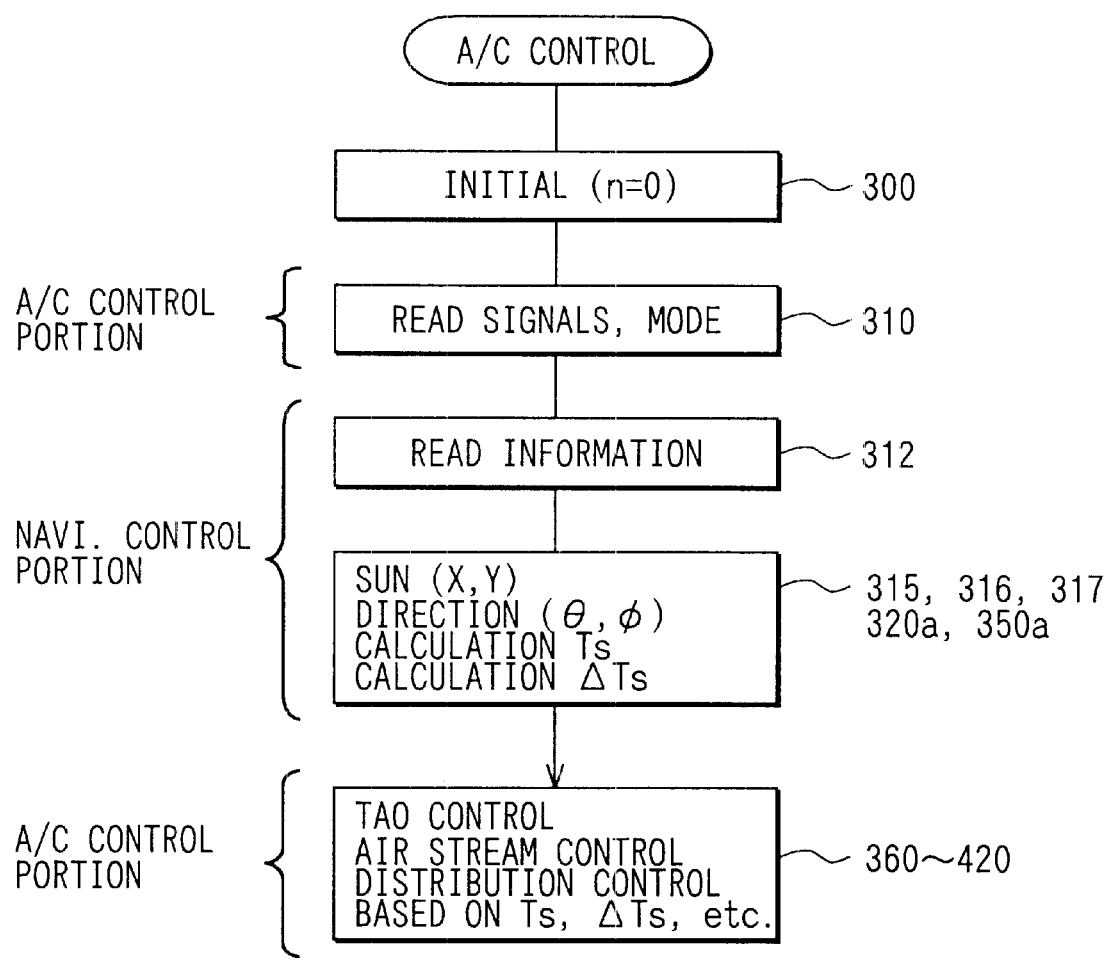
FIG. 7 is a flow chart showing an air conditioning control of the second embodiment of the present invention.

Next, a control flow of the air conditioning control device for vehicle in this embodiment will be described with reference to FIGS. 7–9. FIG. 7 shows a schematic block diagram showing the whole control process of the air conditioning, which is performed in association with a control process by the air conditioning control portion 40*a* shown in FIG. 8 and a control process by the navigation control portion 60 shown in FIG. 9.

The navigation control portion 60, the air conditioning control portion 40*a* and the air conditioner activation device 40*b* can send and receive data through a communicating line having communication function such as the CAN communication. An interruption cycle of the navigation control process by the navigation control portion 60 occurs every 250 ms, and an interruption cycle of the air conditioning control process by the air conditioning control portion 40*a* occurs every 4 sec. In the flowchart, the same process as that in the first embodiment has the same step number and its description will be omitted.

First of all, when an air conditioning activation switch (not shown) is turned on, memorized contents in the data processing memory (RAM) are initialized, and the number of repeating times "n" is set at zero (0) at step 300.

Next, the signals indicative of the environmental conditions such as the inside air temperature Tr, the outside temperature Tam, the set temperature Tset set by the passenger and the like are input at step 310. An activation mode having, for example, the four-seat individual temperature control state and a non-activation state of the rear cooler is input at this step.

Next, at step 312 (shown in FIG. 9 as well as FIG. 7), the navigation control portion 60 reads the current date and the current time, the vehicle location information having the current position and the traveling direction X' of the vehicle that are calculated at the GPS receiver using the speed sensor 32, the gyro 33 and the GPS antenna 31*a*, the road information relating to the road structure, the geography such as a building around the road, the inclined angle of the road and the like that relate to the current position and the traveling direction X' of the vehicle, the vehicle information including the style of the vehicle, the style of the window and the like that are input by the vehicle information input portion 38 and the daylight signal by the daylight sensor 37.

Next, the status of the daylight is memorized at step 313 based on the signal from the daylight sensor 37. The presence or absence of the shielding object against the sunlight is determined and memorized at step 314 based on the road information. Searching of the sun (X,Y) is performed at step 315 based on the current date and the current time.

Here, the step 315, which serves as a sun position detecting means, will be described in detail. The sun position (X, Y), which indicates the position of the sun which changes according to the date and the time and is based on the information having the date and the present time that is read at step 312, can be obtained by using a sun position retrieval map as a sun position memorizing means that is previously memorized in a ROM portion on the air conditioning control portion 40a. The sun position retrieval map is sun position information denoting a sun position necessary for calculating of the sunlight direction (θ, φ) incident into the vehicle described later. Since the position of the sun varies according to the date and the time, it is considered as a map having parameters of the date and the time.

Figure 10A:
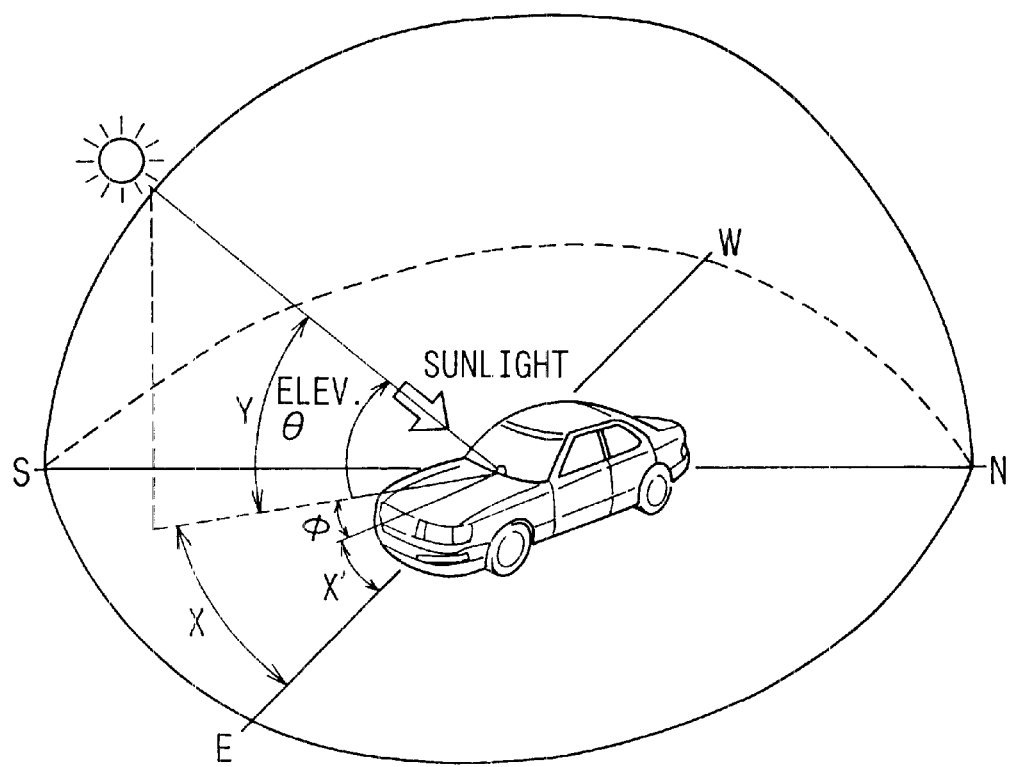
FIG. 10A is a diagram showing a relationship between the location information of the sun and the incident direction of sunlight.

FIG. 10(a) shows an image of the map having parameters of the date and the time as the position information (X, Y). The azimuth data X denotes how many degrees the sun rotates toward the right hand with respect to the due east E, the elevation angle data Y denotes the elevation of the sun. In this embodiment, the position information (X, Y) corresponding to the present date and the present time is picked up from the sun position retrieval map. The position information (X, Y) also can be obtained by a calculation using latitude, celestial declination and hour angle.

Figure 10B:
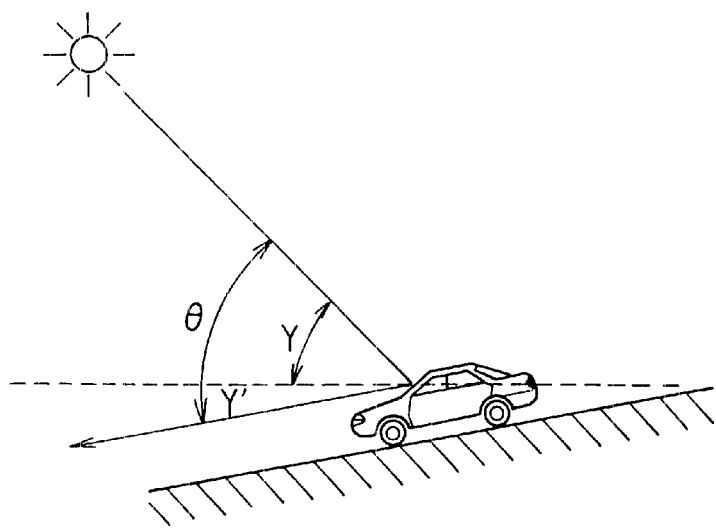
FIG. 10B is a diagram showing a relationship between an oblique angle and an elevation angle of the sunlight in the second embodiment of the present invention.

Next, at step 316 as a sunlight direction calculating means, the sunlight direction (θ, φ) incident into the vehicle is calculated using the position information (X, Y), the traveling information X' of the vehicle, the inclined angle Y' of the road and the vehicle style information. The sunlight elevation angle θ of the sunlight direction (θ, φ) varies, as shown in FIG. 10(b), according to the vehicle style information or the like such as the inclined angle Y' of the road and the vehicle style (the height of the vehicle, the height, position and size of the windshield glass and side glasses, and the height of the passenger's seats). Therefore, the following correction is applied to calculate the sunlight direction (θ, φ) incident into the vehicle precisely.

As one of the corrections, as described above, when the comprehensive navigation deice 30 is installed in the vehicle, the vehicle style information having, for example, the height, size and the like of the windows is input to the vehicle information input portion 38 for the navigation control portion 60. As another information of the correction, the inclined angle of the vehicle, which is obtained from the road information denoting the slope information showing the inclined angle Y' of the road from the road information input portion, is to be retrieved. The sunlight elevation angle θ can be obtained in association with the detected vehicle style information and the detected inclined angle Y'.

The azimuth data X is obtained by calculating the incident angle of the sunlight φ with respect to the left-right direction of the vehicle body (hereinafter, referred to as a sunlight left-right angle) using the following equation (3) based on the traveling direction X' of the vehicle read at step 312.

$$\phi = X - X' \quad (3)$$

The sunlight left-right angle φ is not influenced by the inclined angle Y' of the road. Therefore, it is unnecessary to correct it with the data Y'. In FIG. 10(a), E, W, S, N denote east, west, south and north when the vehicle is supposed to be positioned at a center, respectively. Similar to the azimuth data X, the traveling direction X' of the vehicle denotes how many degrees the forward direction of the vehicle rotates toward the right hand direction with respect to the due east E.

Next, at step 317 as a shielding object determining means, it is determined whether or not the sunlight from the sun, which is obtained by the sunlight left-right angle φ and the sunlight elevation angle θ by the sunlight direction calculating means, is incident into the vehicle in light of the road information read at step 312, that is, in light of the road and the presence of a shielding object such as a multi-story building, a mountain or the like around the road.

When the determination of the presence of a shielding object results in a situation where "the shielding object exists" and "the shielding object does not exist" are obtained frequently, the prediction of the presence of a shielding object may be performed by inputting the information from the vehicle speed sensor 32 while the switching of the result "the shielding object does not exist" is set roughly.

When the determination is the result "the shielding object does not exist," the flow continues to step 320a, the amount of sunlight Ts incident into the vehicle is calculated and memorized by the sunlight amount calculating means. First of all, the direct incident sunlight amount, which corresponds to the present date and the present time based on the information read at step 312, is calculated by retrieving in a sunlight amount memory means and a sunlight amount correction memory means, both of which are previously memorized in the ROM portion of the air conditioning control portion 40a. Then, the mount of sunlight Ts is calculated by collecting the direct incident sunlight amount described above with the sunlight direction (θ, φ).

Figure 11A:
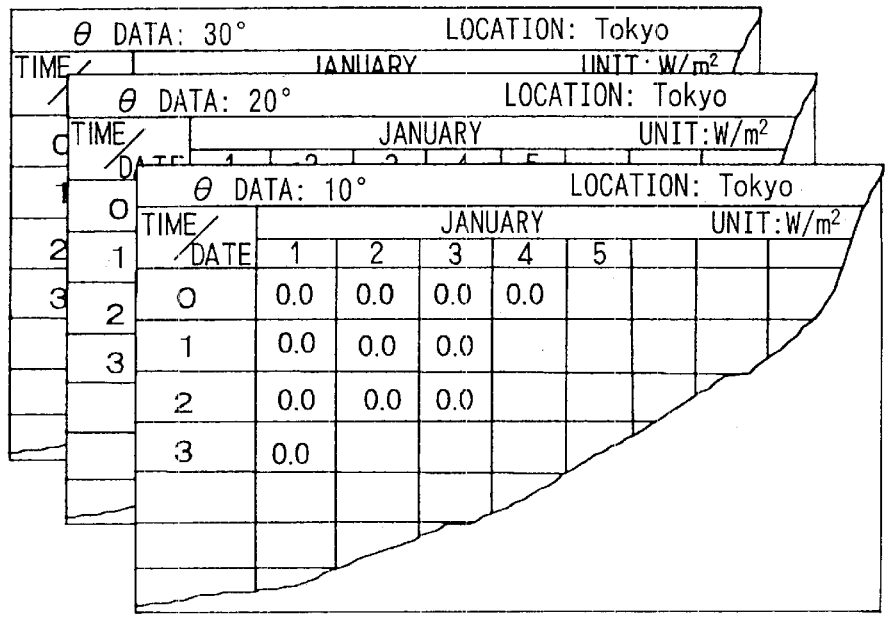
FIG. 11A is a sunlight amount retrieval map showing a relationship between the direct incident sunlight amount and the date and the time in the second embodiment of the present invention.

The sunlight amount memory means, which is a basis for the amount of sunlight Ts, is preset for every area as a sunlight amount retrieval map as shown in FIG. 11(a) by obtaining the amount of sunlight incident into the vehicle at every date and every time with a parameter of the elevation angle data Y. The amount of sunlight is calculated using a direct incident sunlight amount when the sunlight reaches the ground of the earth in clear weather. For example, the direct incident sunlight amount $I_{ND}$ is denoted with the following equation (4).

$$I_{ND} = I_o \times P^{1/\sinh} \quad (4)$$

wherein, $I_o$ denotes the sun constant, P denotes the atmospheric transmissivity and h denotes the altitude of the sun. $I_o$ is constant throughout an year. The atmospheric transmissivity P varies according to the degree of contamination of the atmosphere. Therefore, the direct incident sunlight amount $I_{ND}$ varies according to a season, the time and a location such as a city area or a local area. The atmospheric transmissivity P that differs based on a location and the time can be memorized in the ROM portion of the air conditioning control device 40 previously so that the direct incident sunlight amount $I_{ND}$ can be obtained in association with the position of the vehicle, the date and the time.

Figure 11B:
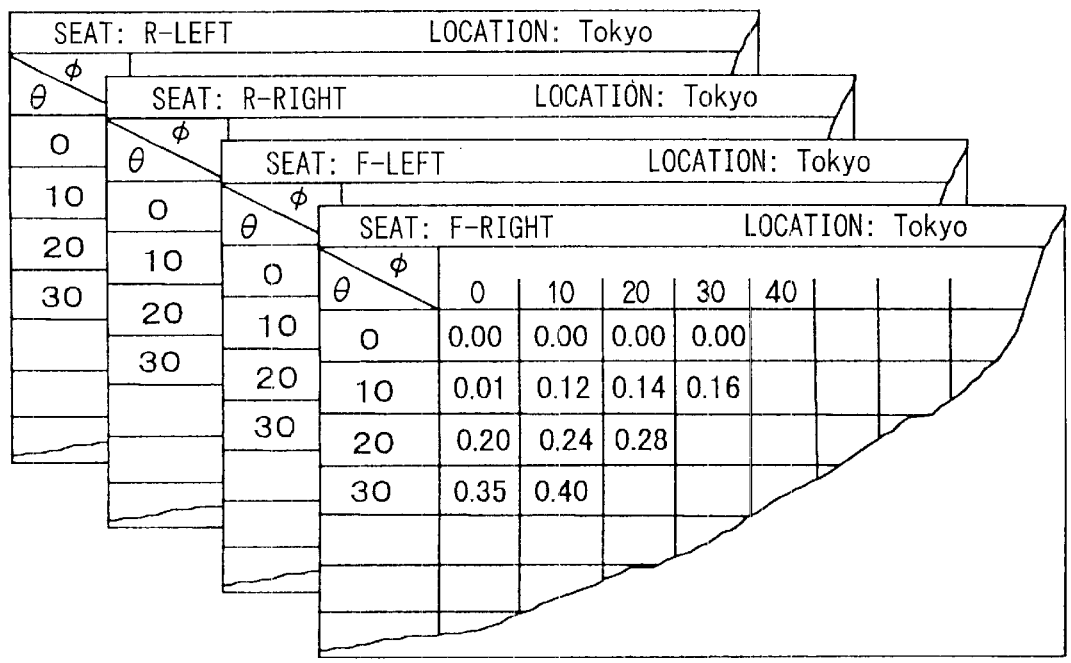
FIG. 11B is a sunlight amount correction coefficient retrieval map showing a relationship between an incident direction of the sunlight stored in a sunlight amount correction coefficient memory means and a correction coefficient of the second embodiment of the present invention.

The sunlight amount correction memory means is a sunlight amount correction coefficient map having a correction coefficient for converting the direct incident sunlight amount $I_{ND}$ described above to the amount of sunlight Ts that is incident into the vehicle. As shown in FIG. 11(b), a correction coefficient corresponding to the sunlight direction (74, φ) is preset using a passenger's seat as a parameter, and obtained from the experiment as follows.

Figure 12A:
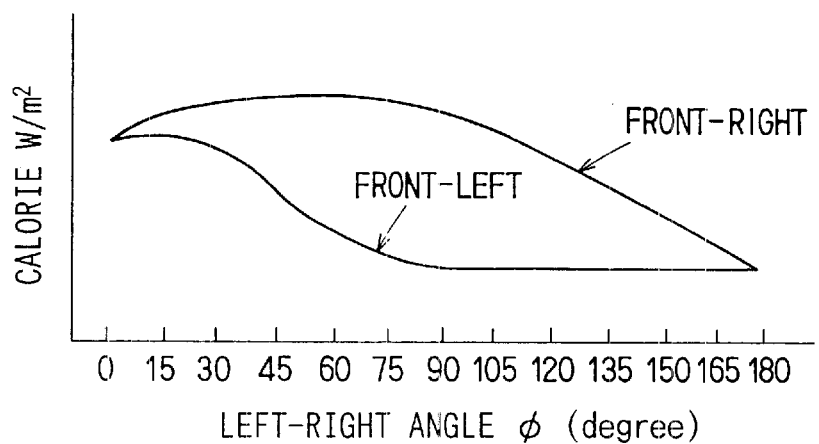
FIG. 12A is a characteristic diagram showing a relationship between the amount of heat received on a seat in the vehicle and an azimuth angle when the elevation angle is constant in the second embodiment of the present invention.
Figure 12B:
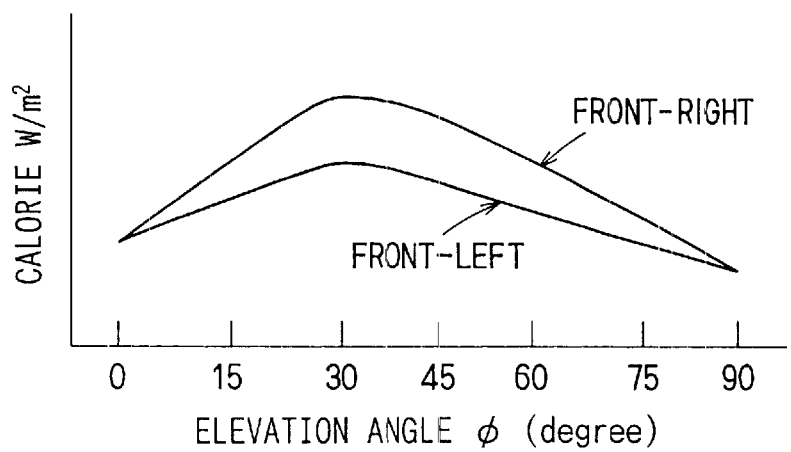
FIG. 12B is a characteristic diagram showing a relationship between the amount of heat received on the seat in the vehicle and the elevation angle when the azimuth angle is constant in the second embodiment of the present invention.

FIG. 12(a) shows, which is one example of the experiment, receiving calorie characteristics at the front-right seat and the front-left seat with respect to change in the sunlight left-right angle φ while the sunlight elevation angle θ is constant at 45 degree. On the other hand, FIG. 12(b) shows receiving calorie characteristics at the front-right seat and the front-left seat with respect to change in the sunlight elevation angle θ while the sunlight left-right angle φ is constant at 45 degree. Both of them show increase in the heat load caused by the sunlight. As shown in the figure, when the sunlight elevation angle θ is constant at 45 degree, the receiving calorie increases while the sunlight left-right angle φ is between 0 degree to 105 degree at the front-right seat, and the receiving calorie increases while the sunlight left-right angle φ is between 0 degree to 45 degree at the front-left seat. On the other hand, when the sunlight left-right angle φ is constant at 45 degree, the receiving calorie has a peak at the respective front-right seat and the front-left seat while the sunlight elevation angle θ is between 15 degree and 45 degree. The correction coefficient can be obtained from the result of the experiment described above and shown in FIGS. 11(*a*) and 11(*b*) at every seat in association with the sunlight direction (θ, φ). Therefore, the amount of sunlight Ts can be obtained by multiplying the direct incident sunlight amount $I_{ND}$ by the correction coefficient based on the direction (θ, φ) of the sunlight incident into the vehicle.

Namely, the direct incident sunlight amount $I_{ND}$ is obtained based on the date, the time, and the current position of the vehicle, and the correction coefficient is obtained in association with the sunlight direction (θ, φ)) as well. Then, the sunlight amount Ts is calculated by multiplying the direct incident sunlight amount $I_{ND}$ by the correction coefficient. Therefore, the sunlight amount Ts at every seat position can be obtained without providing the sunlight amount sensors in the vehicle.

The amount of sunlight Ts incident into the vehicle has the various characteristics due to transmissivity of glass provided in the vehicle. Therefore, the specifics of the glass is preferably input when the vehicle style information is input. The specifics of the glass is, for example, a normal glass, a heat-reflection glass, or a heat-absorbing glass.

Figure 13A:
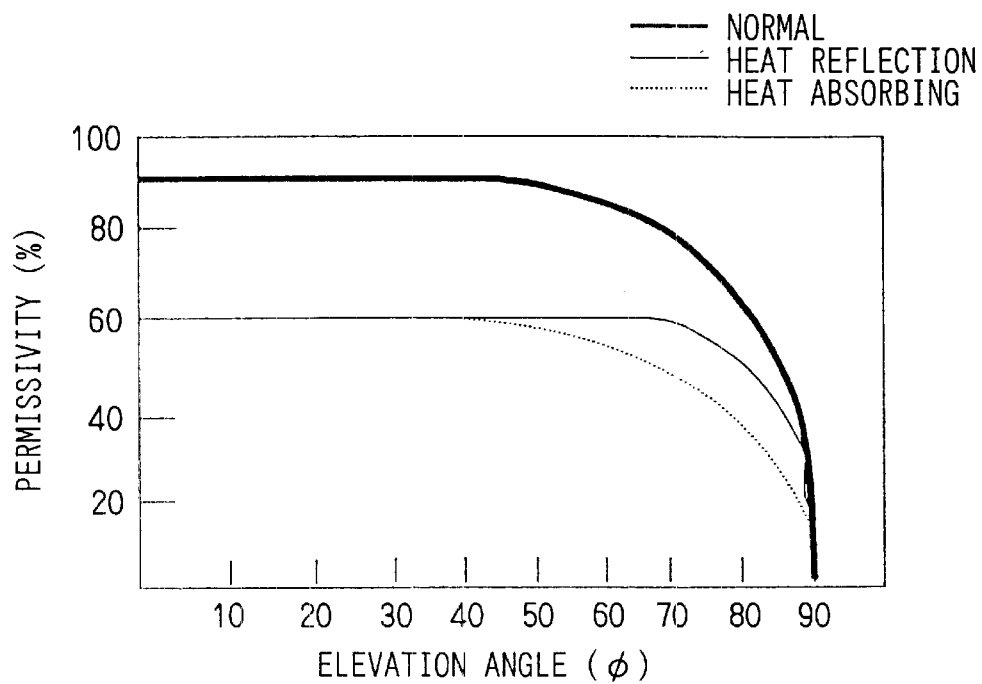
FIG. 13A is a characteristic diagram showing a relationship between the sunlight permeability of a window glass of the vehicle and the elevation angle of the sunlight.
Figure 13B:
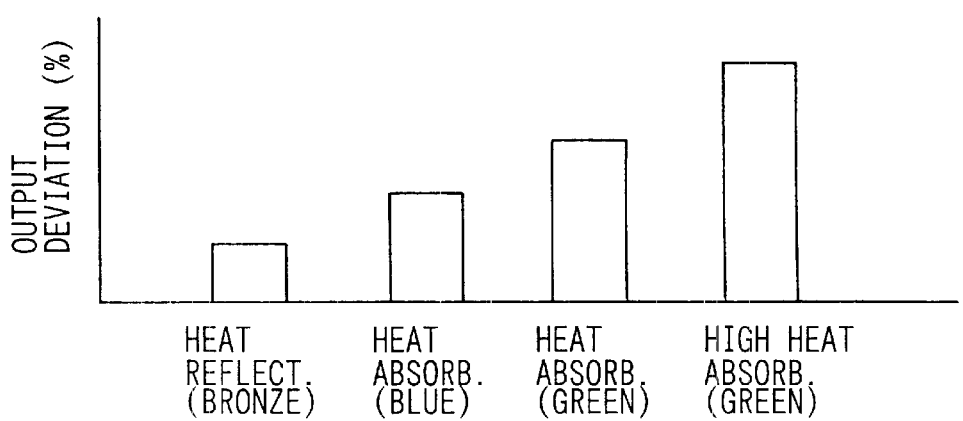
FIG. 13B is a characteristic diagram showing a relationship between the output deviation and variation of the window glass.

As shown in FIG. 13(*a*), the transimissivity of the sunlight varies according to the specifics of the glass and the sunlight elevation angle θ. Therefore, as shown in FIG. 13(*b*), for example, the amount of sunlight Ts incident into the vehicle is corrected in light of the output deviation shown in the figure that is in association with the specifics of the glass so that the amount of sunlight Ts relating to the increase in the heat load caused by the receiving calorie of the sunlight the vehicle and the passenger receive can be detected precisely.

Moreover, the upper body of the passenger such as the head and the chest region mainly receives the sunlight. Therefore, the sunlight elevation angle θ can be obtained precisely by inputting the height of the passenger's seat when the vehicle style information is input.

Similar to the first embodiment, the sunlight amount Ts calculated at every seat position is processed. Namely, a pre-change sunlight amount Ts1 denotes the average value of 16 pieces of data in the previous T2 cycle, and a post-change sunlight amount Ts2 denotes the average value of 16 pieces of data in the current T2 cycle.

Next, a sunlight change amount ΔTs different between the Ts1 and Ts2 is calculated at step 350*a*. Similar to the first embodiment, the change amount ΔTs is obtained as an average value between the respective change amounts of the front-left seat side and the front-right seat side, and an average value between the respective change amounts of the rear-left seat side and the rear-right seat side.

Figure 8:
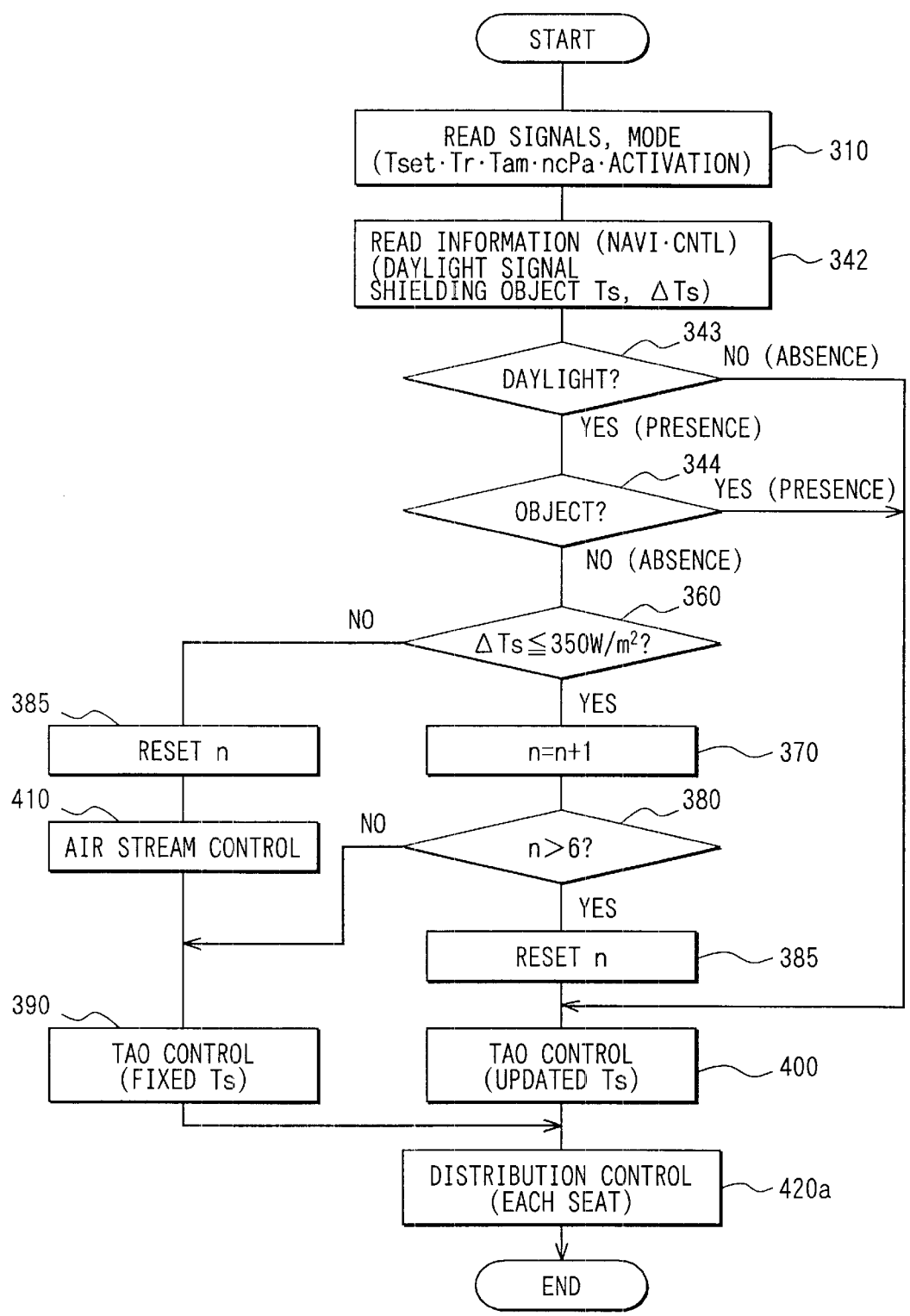
FIG. 8 is a detailed flow chart showing a main feature of the air conditioning in the second embodiment of the present invention.
Figure 9:
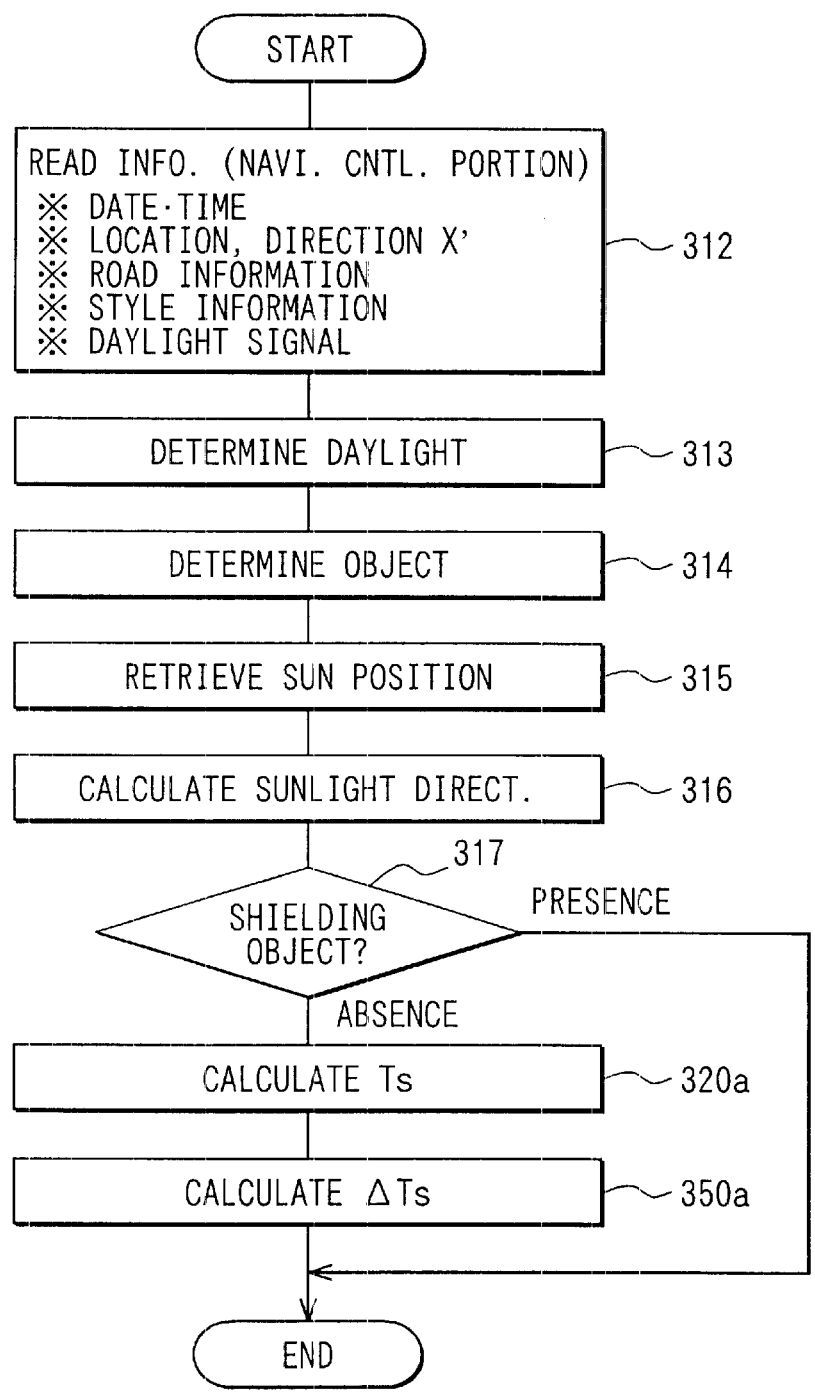
FIG. 9 is a detailed flow chart showing a main feature for obtaining the sunlight information using the navigation system in the second embodiment of the present invention.

The air conditioning control portion 40*a* reads the daylight signal (presence or absence of the daylight), the presence or absence of the shielding object, the amount of sunlight Ts and the sunlight change amount ΔTs from the navigation control portion 60 at step 342 as shown in FIG. 8. Based on information read from the navigation control portion 60, the air conditioning control portion 40*a* outputs signals to the air conditioner activation device 40*b* to perform the following air conditioning.

It is determined whether or not the daylight is present in the sense of the detected signal from the daylight sensor 37 at step 343. When it is determined that the daylight is "present", the flow continues to step 344 to determine whether or not the sunlight to be incident into the vehicle is shielded. When it is determined that the shielding object is "not present (absent)," the flow continues to step 360 to determine whether or not the sunlight change amount ΔTs exceeds the predetermined amount (for example, 350 W/m$^2$). The other steps are the same as those in the first embodiment, and therefore, omitted.

As for the conditioned air distribution control at step 420*a*, it is preferably performed by memorizing the air-distribution rate information at the air conditioning control portion 40*a*, which has the distribution rate in each seat position in association with the sunlight direction (θ, φ).

Figure 14A:
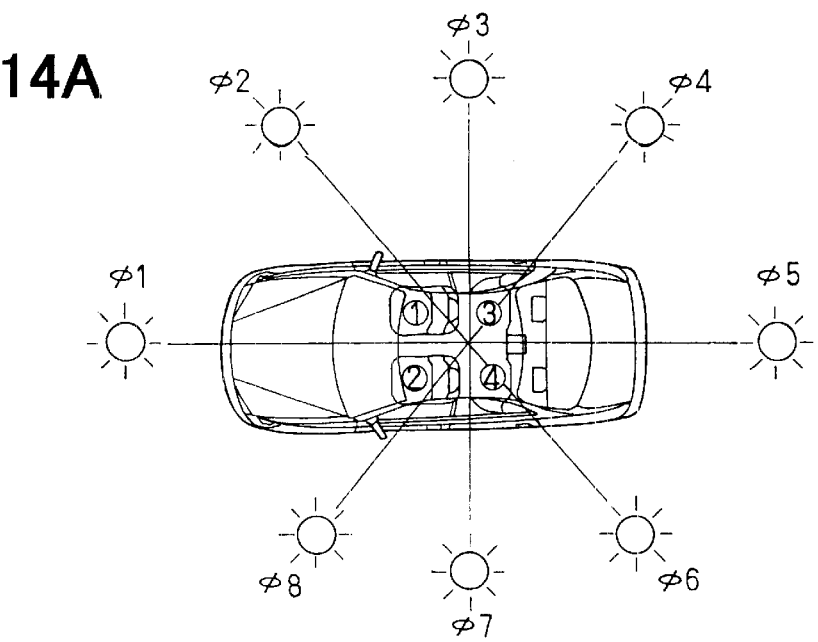
FIG. 14A is a diagram showing the azimuth angle of the sunlight incident into the vehicle.
Figure 14B:
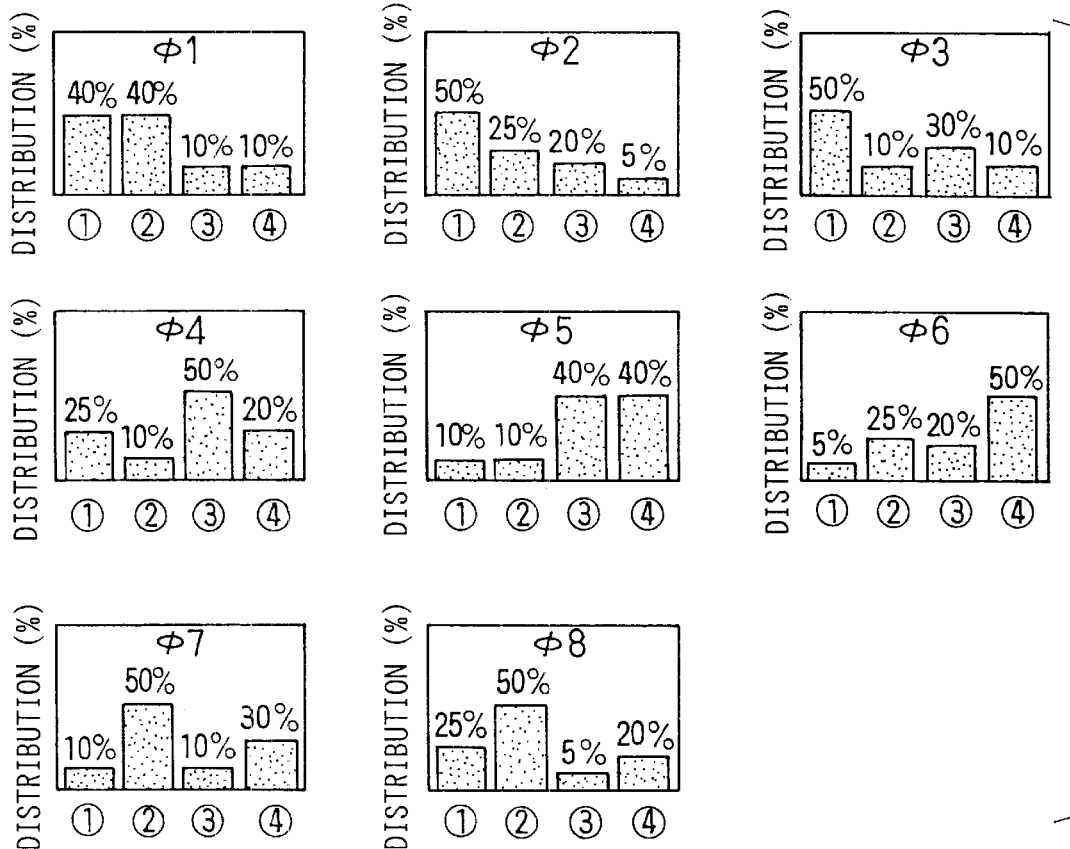
FIG. 14B is a diagram showing a distribution characteristic of the air blown toward each passenger according to the azimuth angle of the sunlight.

FIGS. 14A and 14B show the examples of the distribution rate. These air-distribution rates information are obtained when the sunlight left-right angle φ varies from φ1(zero degree) to φ8(315 degree) while the sunlight elevation angle θ is kept constant (for example, 60 degree). As understood from the figures, the distribution rate at the passenger's seat(s) where the sunlight is incident is set at high as compared to the other seats. According to this control pattern, the blow-out control in association with the heat load received at the vehicle and the passenger can be performed. In this embodiment, the air-distribution rates information that are obtained by varying the sunlight elevation angle θ from zero degree to 90 degree at a step of 10 degree in association with the sunlight left-right angle φ.

With this feature described above, the air conditioning can be achieved so that the temperature feeling of the passenger is satisfied.

According to the second embodiment, the amount of sunlight Ts and the sunlight change amount ΔTs at each seat position is obtained more precisely as compared to that of the first embodiment employing two sunlight amount sensors 53. Moreover, the relative position between the position of the sun and the traveling direction can be calculated properly. More specifically, the direction (θ, φ) of the sunlight incident into the vehicle can be obtained promptly and precisely. As a result, the passenger's seat(s), which receives the sunlight in the vehicle, can be determined, and therefore, the precise air conditioning can be achieved.

Furthermore, the precise sunlight change amount ΔTs can be obtained. When using only the normal air conditioning control (such as step 400), the uncomfortable feeling of the passenger might be caused since the blowing-air amount changes frequently. On the other hand, the air conditioning in which the pre-change sunlight amount Ts1 is fixed to be used in the calculation obtaining the target blowing temperature TAO is performed while the sunlight change amount ΔTs is unstable (step 390), so as to prevent the uncomfortable feeling of the passenger from being caused, by continuing the air condition in which the amount of the blow-out air is kept at the level before the sunlight change amount ΔTs changes frequently.

Also, the air conditioning control portion 40*a* is constituted by the calculating device for the control process such as the air conditioning program that is common to the navigation control portion 60 capable of having a DVD which can include the huge amount of information. Therefore, the control process, such as memorizing the data and processing the data can be performed promptly.

In the above-mentioned embodiments, although the particular situation is described, where the air conditioning for the increase in the heat load of the amount of sunlight Ts incident into the vehicle is performed by detecting the amount of sunlight Ts corresponding to the direction (θ, φ)of the sunlight incident into the vehicle and distributing the conditioned air for every seat position by the blowing air distribution control when the activation mode is set at the four-seat individual temperature control, the invention is not limited to the above. For example, the air conditioning described above can be applied to the activation mode such as a driver's seat temperature control, an individual temperature control of two sides of the front seats and the rear seats, an individual temperature control of three sides of the front-left seat, the front-right seat and the two seats at the rear side, or the like.

Figure 15:
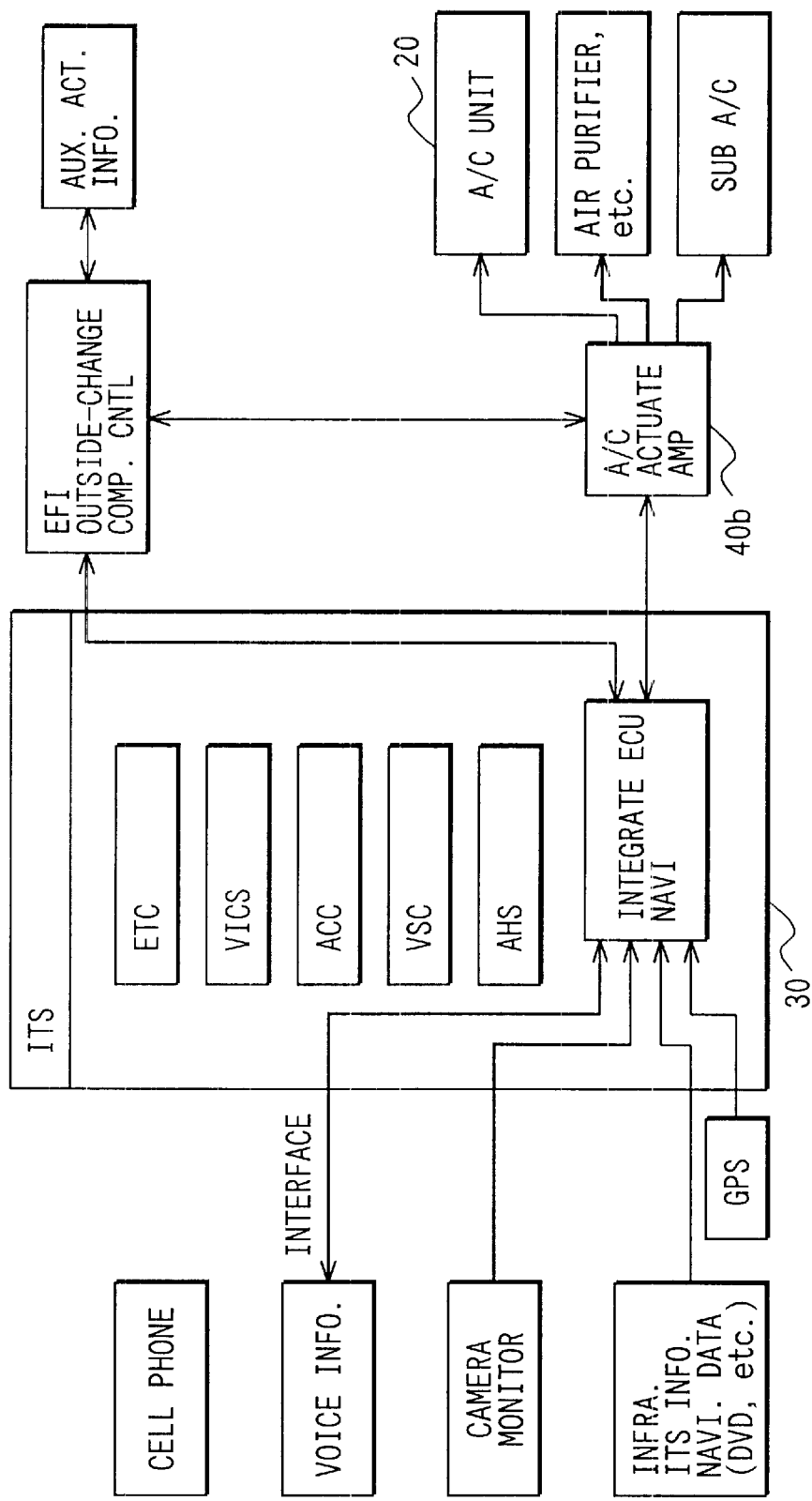
FIG. 15 is a block diagram showing a controller in an air conditioner and an ITS controller of another embodiment of the present invention.

Although the air conditioning control portion 40a is included in the comprehensive navigation device 30 in the second embodiment, as shown in FIG. 15, it can be included in a central control unit that performs retrieval and processing of the data relating to the vehicle information, such as an ITS (Intelligent Transport System). The same or similar portion in FIG. 15 has the same numeral as that shown in FIG. 6.

In that case, a computing device, for calculating and controlling an ETC (Electronic Toll System) that automatizes the payment for a fee of a toll road, a VICS (Vehicle Information and Communication System), a VSC (Vehicle Stability Control) that stabilizes the vehicle when the vehicle turns, and an AHS (Automated Highway System) that is for an automatic driving system, is provided to be used in common as a total navigation ECU.

While the present invention has been shown and described with reference to the foregoing preferred embodiment, it will be apparent to those skilled in the art that changes in form and detail may be therein without departing from the scope of the invention as defined in the appended claims.

What is claimed is:

1. A control device in a vehicle having an air conditioner comprising:
   a sunlight amount detecting portion for detecting an amount of sunlight incident into a passenger's compartment of the vehicle;
   an air conditioning control portion for controlling the blow-out of air conditioned in the vehicle air conditioner from a plurality of blow-out ports in association with the information including a signal detected by the sunlight amount detecting portion and a signal detected by a sensor portion provided in the vehicle, wherein:
      said air conditioning control portion performs an air conditioning in the vehicle by using a fixed sunlight value when a sunlight change amount obtained from the amount of sunlight detected by the sunlight amount detecting portion is equal to or less than a predetermined value.

2. A control device in a vehicle having an air conditioner according to claim 1, wherein said fixed sunlight value is a value corresponding to the amount of sunlight that is used before said sunlight change amount becomes equal to or less than the predetermined value.

3. A control device in a vehicle having an air conditioner according to claim 1, wherein the conditioned air is blown out toward a passenger who receives the sunlight when said sunlight change amount obtained from the amount of sunlight detected by the sunlight amount detecting portion exceeds the predetermined value.

4. A control device in a vehicle having an air conditioner according to claim 1, wherein the sunlight amount detecting portion is a sunlight detecting sensor.

5. A control device in a vehicle having an air conditioner according to claim 1, wherein the air conditioning control portion calculates a target blowing temperature based on the information including the signal detected by the sunlight amount detecting portion and the signal detected by the sensor portion provided in the vehicle, and determines a temperature of the conditioned air and an amount of the conditioned air blown into the passenger's compartment.

6. A control device in a vehicle having an air conditioner according to claim 1, wherein the sunlight amount detecting portion has a navigation control portion that detects a current position and a traveling direction of the vehicle and performs a traveling guide based on said detected current position of the vehicle, said detected traveling direction of the vehicle and the road information memorized therein previously, the amount of sunlight incident into the passenger's compartment of the vehicle is obtained in association with a location of the sun corresponding to a current date and a current time obtained by the navigation control portion.

7. A control device in a vehicle having an air conditioner comprising:
   a navigation control portion for detecting a current position and a traveling direction of the vehicle and for performing a traveling guide based on said detected current position of the vehicle, said detected traveling direction of the vehicle and the road information memorized therein previously;
   an air conditioning control portion for controlling blow-out of air conditioned in the vehicle air conditioner from a plurality of blow-out ports in association with a signal detected by a sensor portion provided in the vehicle and information including said road information from the navigation control portion, wherein:
      said navigation control portion obtains a location of the sun corresponding to a current date and a current time, a direction of sunlight incident into the vehicle based on said location of the sun and said road information, and an amount of sunlight incident into the vehicle in light of direct incident amount of sunlight that reaches the ground obtained from the location of the sun, wherein:
         said air conditioning control portion performs an air conditioning in the vehicle by using a fixed sunlight value when a sunlight change amount in association with the amount of sunlight obtained by the navigation control portion is equal to or less than a predetermined value.

8. A control device in a vehicle having an air conditioner according to claim 7, wherein said fixed sunlight value is a value corresponding to the amount of sunlight that is used before said sunlight change amount becomes equal to or less than the predetermined value.

9. A control device in a vehicle having an air conditioner according to claim 7, wherein the conditioned air is blown out toward a passenger who receives the sunlight when said sunlight change amount exceeds the predetermined value.

10. A control device in a vehicle having an air conditioner according to claim 7, wherein the navigation control portion and the air conditioning control portion are constituted by a common computing device.

11. A control device in a vehicle having an air conditioner, comprising:
   a sunlight amount detecting portion for detecting an amount of sunlight incident into the vehicle; and
   an air conditioning control portion for controlling blow-out of air conditioned in the vehicle air conditioner from a plurality of blow-out ports in association with information including a signal detected by the sunlight amount detecting portion and a signal detected by a sensor portion provided in the vehicle, wherein:
      the air conditioning control portion performs an air conditioning in the vehicle by using a fixed sunlight value, when a sunlight change amount obtained from a sunlight detection value detected by the sunlight amount detecting portion is equal to or less than a predetermined value, and when a condition where the sunlight change amount is equal to or less than the predetermined value continues shorter than a predetermined time; and the air conditioning control portion performs the air conditioning by using an updated sunlight value that is obtained by the sunlight amount detecting portion, when the condition continues for the predetermined time.

12. A control device in a vehicle having an air conditioner, comprising:

a navigation control portion for detecting a current position and a traveling direction of the vehicle and for performing a traveling guide based on the detected current position of the vehicle, the detected traveling direction of the vehicle and road information memorized therein previously;

an air conditioning portion for controlling blow-out of air conditioned in the vehicle air conditioner from a plurality of blow-out ports in association with a signal detected by a sensor portion provided in the vehicle and information including the road information from the navigation control portion, wherein:

the navigation control portion obtains a location of the sun corresponding to a current date and a current time, a direction of sunlight incident to the vehicle based on the location of the sun and the road information, and an amount of sunlight incident into the vehicle in light of a direct incident amount of sunlight that reaches the ground obtained from the location of the sun;

the air conditioning control portion performs an air conditioning in the vehicle by using a fixed sunlight value, when a sunlight change amount in association with the amount of sunlight obtained by the navigation control portion is equal to or less that a predetermined value, and when a condition where the sunlight change amount is equal to or less than the predetermined value continues shorter than a predetermined time; and the air conditioning control portion performs the air conditioning by using an updated sunlight value that is obtained by the navigation control portion, when the condition continues for the predetermined time.

* * * * *